United States Patent
Williams et al.

(10) Patent No.: US 11,537,519 B1
(45) Date of Patent: Dec. 27, 2022

(54) MARKING IN-FLIGHT REQUESTS AFFECTED BY TRANSLATION ENTRY INVALIDATION IN A DATA PROCESSING SYSTEM

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Hugh Shen, Round Rock, TX (US); David Campbell, Austin, TX (US); Bryan Lloyd, Austin, TX (US); Samuel David Kirchhoff, Austin, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/389,012

(22) Filed: Jul. 29, 2021

(51) Int. Cl.
*G06F 12/0811* (2016.01)
*G06F 12/0808* (2016.01)
*G06F 12/02* (2006.01)
*G06F 12/1045* (2016.01)
*G06F 12/0817* (2016.01)

(52) U.S. Cl.
CPC ...... *G06F 12/0811* (2013.01); *G06F 12/0238* (2013.01); *G06F 12/0808* (2013.01); *G06F 12/0817* (2013.01); *G06F 12/1045* (2013.01)

(58) Field of Classification Search
CPC ............ G06F 12/0238; G06F 12/0808; G06F 12/0811; G06F 12/0817; G06F 12/1045
See application file for complete search history.

(56) References Cited

U.S. PATENT DOCUMENTS

| | | |
|---|---|---|
| 5,437,017 A | 7/1995 | Moore et al. |
| 6,161,166 A | 12/2000 | Doing et al. |
| 6,826,654 B2 | 11/2004 | Arimilli et al. |
| 8,112,174 B2 | 2/2012 | Hsieh et al. |
| 8,751,752 B2 | 6/2014 | Cota-Robles et al. |
| 9,727,483 B2 | 8/2017 | Blaner et al. |
| 10,740,239 B2 | 8/2020 | Williams et al. |
| 10,977,183 B2 | 4/2021 | Williams et al. |
| 2017/0177421 A1* | 6/2017 | Guthrie ............... G06F 12/1027 |
| 2020/0201780 A1* | 6/2020 | Williams ............ G06F 12/1027 |

* cited by examiner

*Primary Examiner* — Aracelis Ruiz
(74) *Attorney, Agent, or Firm* — Brian F. Russell; Nathan Rau

(57) ABSTRACT

A memory-referent instruction is executed to calculate a target effective address (EA) of a corresponding memory-referent request. An array entry in an upper level cache is allocated, and the EA is specified in a corresponding EA directory entry. While in-flight, the memory-referent request is buffered in a queue in association with a pointer to the entry in the EA directory. Based on receiving a translation invalidation request requesting invalidation of an address translation in a translation structure, the processor core walks the EA directory, determines the EA in the entry matches an address range specified by the translation invalidation request, and, based on the match, precisely marks the memory-referent request using the pointer to the EA directory entry. Based on the marking, the translation invalidation request is permitted to complete with reference to the processor core only after the memory-referent request has drained from the processing unit.

19 Claims, 18 Drawing Sheets

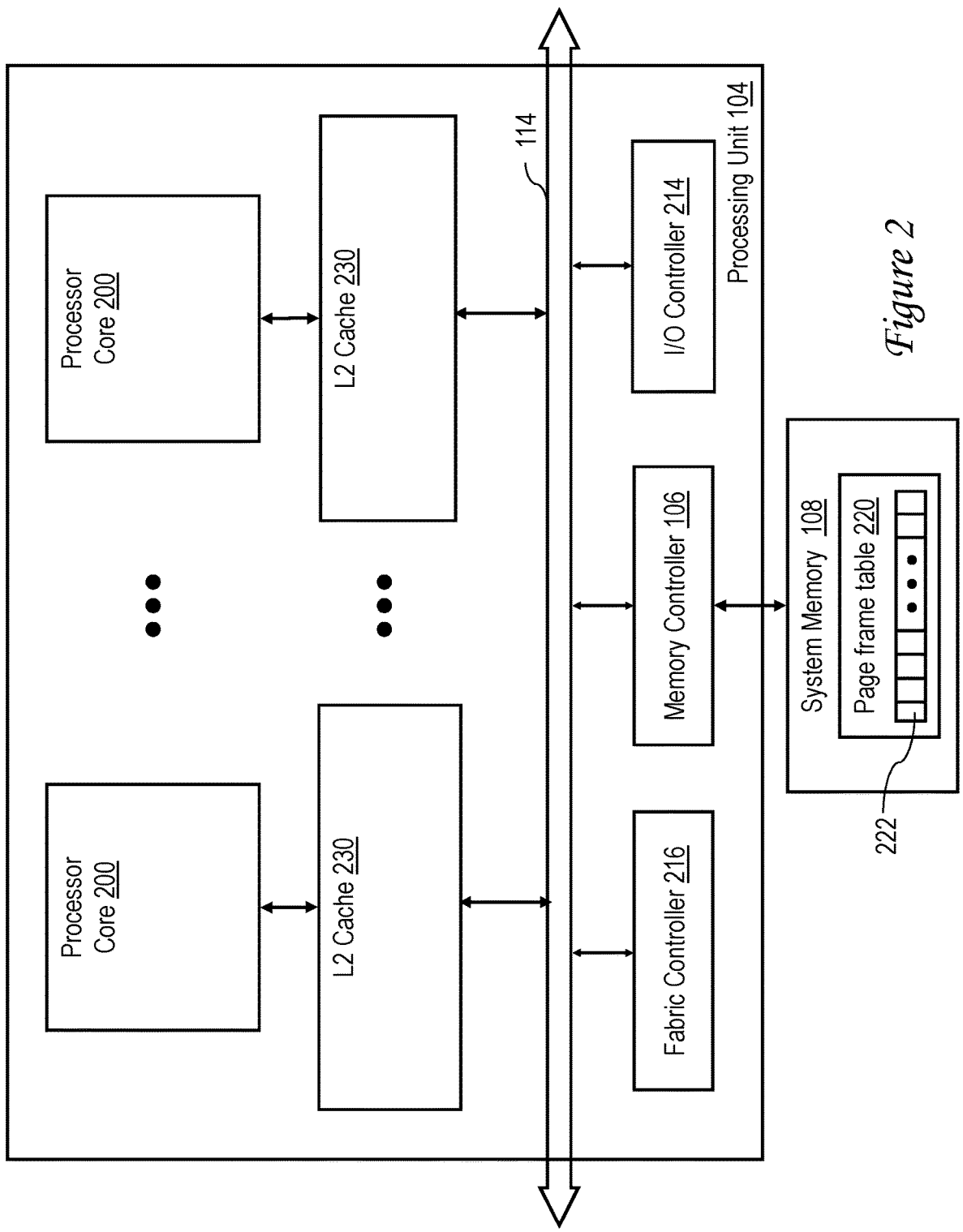

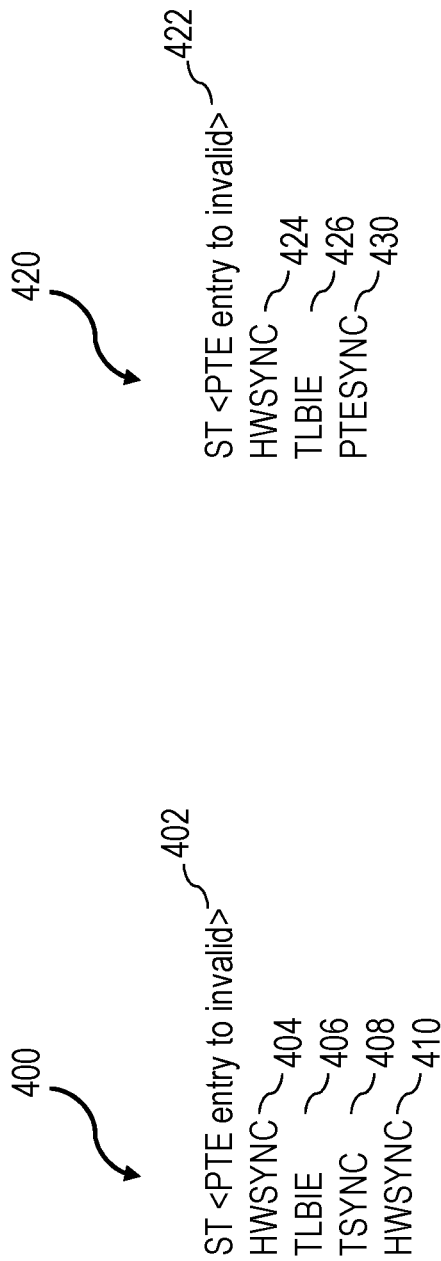

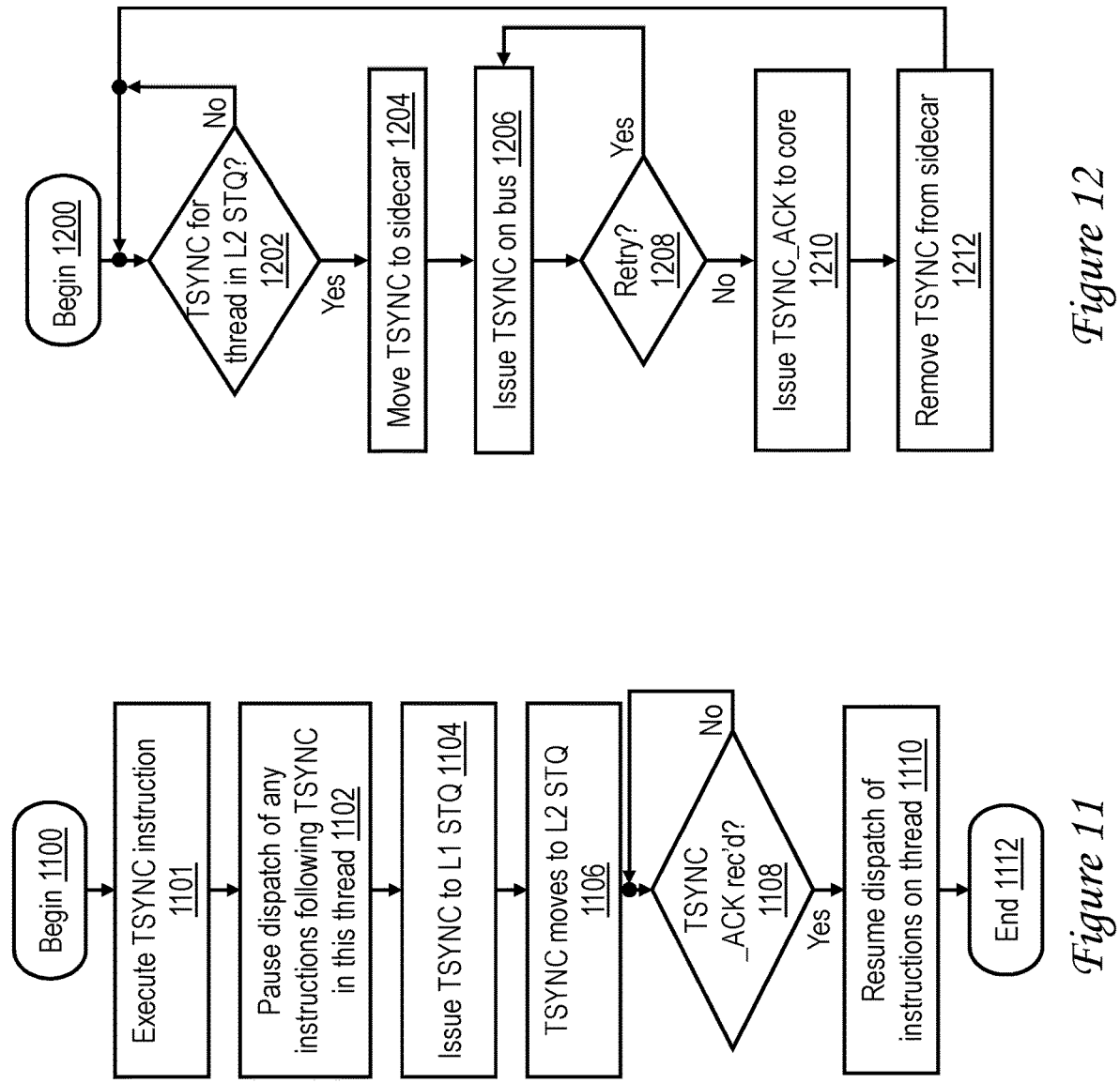

MARKING IN-FLIGHT REQUESTS AFFECTED BY TRANSLATION ENTRY INVALIDATION IN A DATA PROCESSING SYSTEM

BACKGROUND OF THE INVENTION

The present invention relates generally to data processing and, in particular, to translation entry invalidation in a data processing system.

A conventional multiprocessor (MP) computer system comprises multiple processing units (which can each include one or more processor cores and their various cache memories), input/output (I/O) devices, and data storage, which can include both system memory (which can be volatile or nonvolatile) and nonvolatile mass storage. In order to provide enough addresses for memory-mapped I/O operations and the data and instructions utilized by operating system and application software, MP computer systems typically reference an effective address space that includes a much larger number of effective addresses than the number of physical storage locations in the memory mapped I/O devices and system memory. Therefore, to perform memory-mapped I/O or to access system memory, a processor core within a computer system that utilizes effective addressing is required to translate an effective address into a real address assigned to a particular I/O device or a physical storage location within system memory.

In the POWER™ RISC architecture, the effective address space is partitioned into a number of uniformly-sized memory pages, where each page has a respective associated address descriptor called a page table entry (PTE). The PTE corresponding to a particular memory page contains the base effective address of the memory page as well as the associated base real address of the page frame, thereby enabling a processor core to translate any effective address within the memory page into a real address in system memory. The PTEs, which are created in system memory by the operating system and/or hypervisor software, are collected in a page frame table.

In order to expedite the translation of effective addresses to real addresses during the processing of memory-mapped I/O and memory access instructions (hereinafter, together referred to simply as "memory-referent instructions"), a conventional processor core often employs, among other translation structures, a cache referred to as a translation lookaside buffer (TLB) to buffer recently accessed PTEs within the processor core. Of course, as data are moved into and out of physical storage locations in system memory (e.g., in response to the invocation of a new process or a context switch), the entries in the TLB must be updated to reflect the presence of the new data, and the TLB entries associated with data removed from system memory (e.g., paged out to nonvolatile mass storage) must be invalidated. In many conventional processors such as the POWER™ line of processors available from IBM Corporation, the invalidation of TLB entries is the responsibility of software and is accomplished through the execution of an explicit TLB invalidate entry instruction (e.g., TLBIE in the POWER™ instruction set architecture (ISA)).

In MP computer systems, the invalidation of a PTE cached in the TLB of one processor core is complicated by the fact that each other processor core has its own respective TLB, which may also cache a copy of the target PTE. In order to maintain a consistent view of system memory across all the processor cores, the invalidation of a PTE in one processor core requires the invalidation of the same PTE, if present, within the TLBs of all other processor cores. In many conventional MP computer systems, the invalidation of a PTE in all processor cores in the system is accomplished by the execution of a TLB invalidate entry instruction within an initiating processor core and the broadcast of a TLB invalidate entry request from the initiating processor core to each other processor core in the system. The TLB invalidate entry instruction (or instructions, if multiple PTEs are to be invalidated) may be followed in the instruction sequence of the initiating processor core by one or more synchronization instructions that guarantee that the TLB entry invalidation has been performed by all processor cores.

In conventional MP computer systems, the TLB invalidate entry instruction and associated synchronization instructions are strictly serialized, meaning that hardware thread of the initiating processor core that includes the TLB invalidate entry instruction must complete processing each instruction (e.g., by broadcasting the TLB invalidate entry request to other processor cores) before execution proceeds to the next instruction of the hardware thread. As a result of this serialization, at least the hardware thread of the initiating processor core that includes the TLB entry invalidation instruction incurs a large performance penalty, particularly if the hardware thread includes multiple TLB invalidate entry instructions.

In multithreaded processing units, it is often the case that at least some of the queues, buffers, and other storage facilities of the processing unit are shared by multiple hardware threads. The strict serialization of the TLBIE invalidate entry instruction and associated synchronization instructions can cause certain of the requests associated with the TLB invalidation sequence to stall in these shared facilities, for example, while awaiting confirmation of the processing of the requests by other processor cores. If not handled appropriately, such stalls can cause other hardware threads sharing the storage facilities to experience high latency and/or to deadlock.

In view of the foregoing, the present invention recognizes that it would be useful and desirable to provide an improved method for maintaining coherency of PTEs in a data processing system.

BRIEF SUMMARY

In at least one embodiment, a memory-referent instruction is executed to calculate a target effective address (EA) of a corresponding memory-referent request. An array entry in an upper level cache is allocated, and the EA is specified in a corresponding EA directory entry. While in-flight, the memory-referent request is buffered in a queue in association with a pointer to the entry in the EA directory. Based on receiving a translation invalidation request requesting invalidation of an address translation in a translation structure, the processor core walks the EA directory, determines the EA in the entry matches an address range specified by the translation invalidation request, and, based on the match, precisely marks the memory-referent request using the pointer to the EA directory entry. Based on the marking, the translation invalidation request is permitted to complete with reference to the processor core only after the memory-referent request has drained from the processing unit.

BRIEF DESCRIPTION OF THE SEVERAL VIEWS OF THE DRAWINGS

FIG. 2 is a more detailed block diagram of an exemplary processing unit in accordance with one embodiment;

FIG. 4A is a first exemplary translation entry invalidation instruction sequence in accordance with one embodiment;

FIG. 4B is a second exemplary translation entry invalidation instruction sequence in accordance with one embodiment;

FIG. 11 is a high-level logical flowchart of an exemplary method by which a processor core processes a translation synchronization instruction in accordance with one embodiment;

FIG. 12 is a high-level logical flowchart of an exemplary method by which sidecar logic of a processing unit processes a translation synchronization request in accordance with one embodiment;

DETAILED DESCRIPTION

Figure 1:
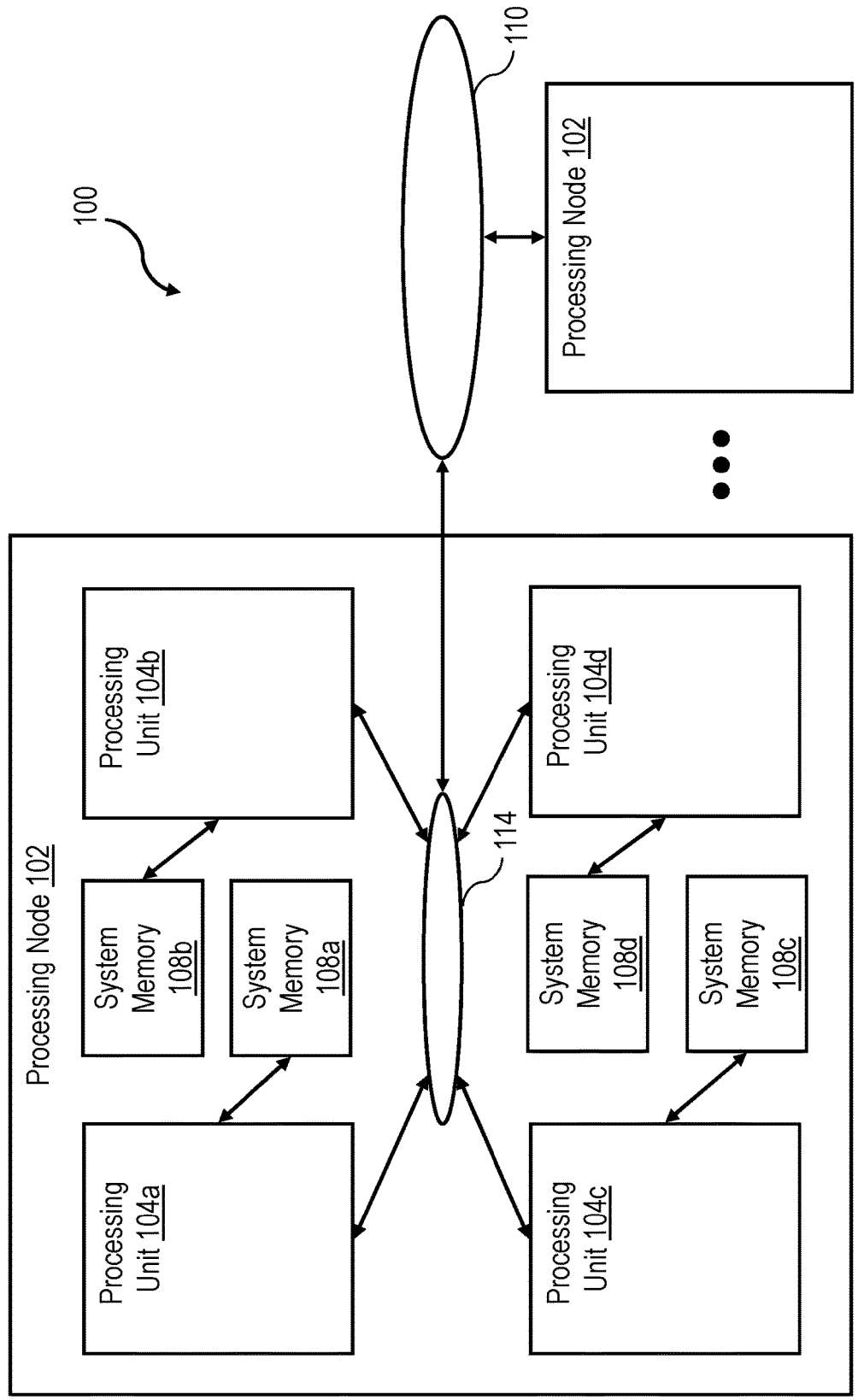
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high-level block diagram depicting an exemplary data processing system 100 in accordance with one embodiment. In the depicted embodiment, data processing system 100 is a cache coherent symmetric multiprocessor (SMP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of memory storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Referring now to FIG. 2, there is depicted a more detailed block diagram of an exemplary processing unit 104 in accordance with one embodiment. In the depicted embodiment, each processing unit 104 is an integrated circuit including one or more processor cores 200 for processing instructions and data. In a preferred embodiment, each processor core 200 supports simultaneous multithreading (SMT) and thus is capable of independently executing multiple hardware threads of execution simultaneously.

The operation of each processor core 200 is supported by a multi-level memory hierarchy having at its lowest level a shared system memory 108 accessed via an integrated memory controller 106. As illustrated, shared system memory 108 stores a page frame table 220 containing a plurality of page table entries (PTEs) 222 for performing effective-to-real address translation to enable access to the storage locations in system memory 108. At its upper levels, the multi-level memory hierarchy includes one or more levels of cache memory, which in the illustrative embodiment include a store-through level one (L1) cache 302 (see FIG. 3) within and private to each processor core 200, and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

Figure 3A:
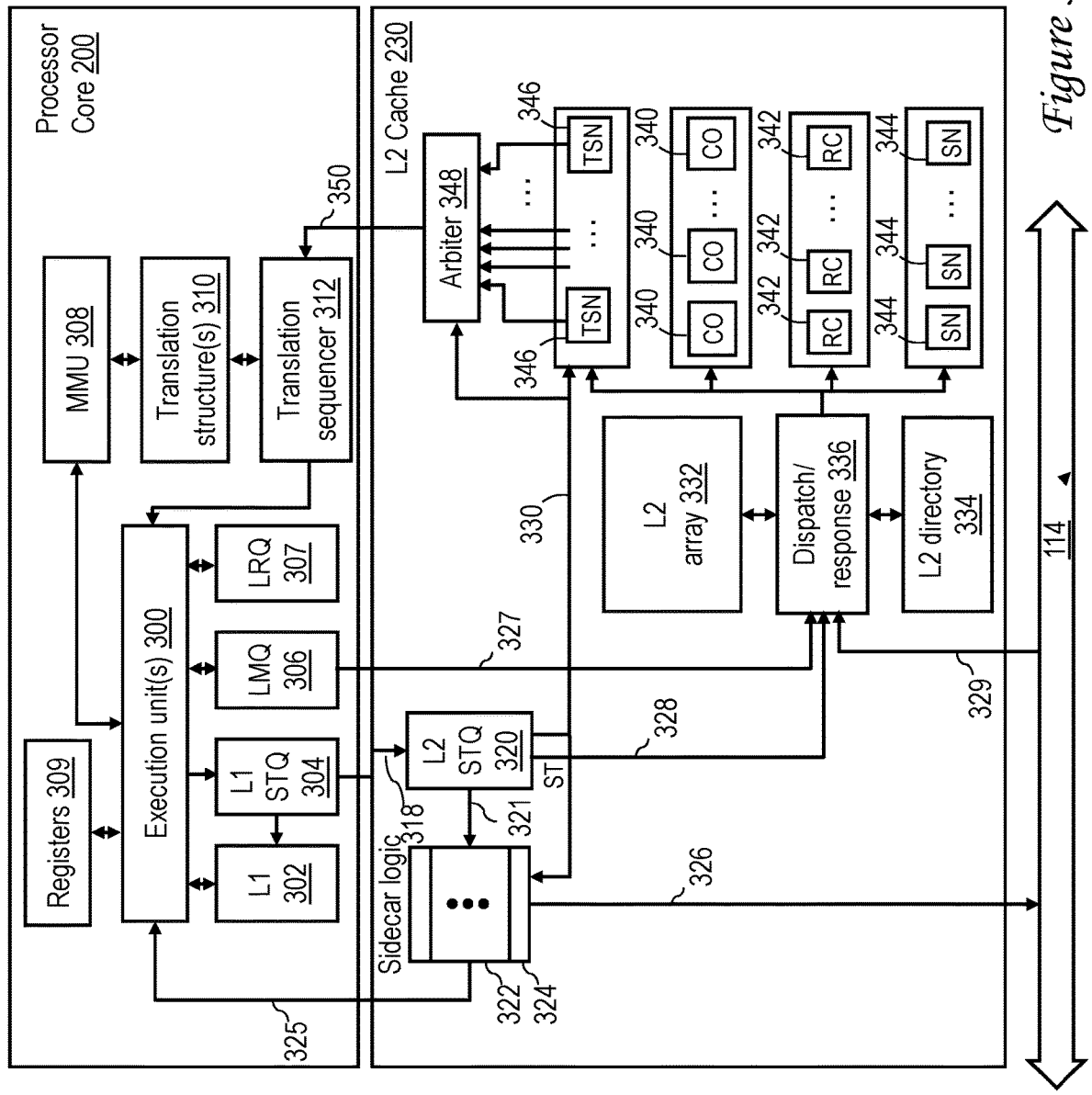
FIG. 3A is a detailed block diagram of a processor core and lower level cache memory in accordance with one embodiment.

With reference now to FIG. 3A, there is illustrated a more detailed block diagram of an exemplary embodiment of a processor core 200 and its affiliated L2 cache 230 in accordance with one embodiment.

In the illustrated embodiment, processor core 200 includes one or more execution unit(s) 300, which execute instructions from multiple simultaneous hardware threads of execution. The instructions can include, for example, arithmetic instructions, logical instructions, and memory-referent instructions, as well as translation entry invalidation instructions (hereinafter referred to by the POWER™ ISA mnemonic TLBIE (Translation Lookaside Buffer Invalidate Entry)) and associated synchronization instructions. Execution unit(s) 300 can generally execute instructions of a hardware thread in any order as long as data dependencies and explicit orderings mandated by synchronization instructions are observed. In executing instructions, execution unit(s) 300 accesses source operands from registers 309 and causes destination operands to be written into registers 309.

Processor core 200 additionally includes a memory management unit (MMU) 308 responsible for translating target effective addresses determined by the execution of memory-referent instructions in execution unit(s) 300 into real addresses. MMU 308 performs effective-to-real address translation by reference to one or more translation structure(s) 310, such as a translation lookaside buffer (TLB), block address table (BAT), segment lookaside buffers (SLBs), etc. The number and type of these translation structures varies between implementations and architectures. If present, the TLB reduces the latency associated with effective-to-real address translation by caching PTEs 222 retrieved from page frame table 220. A translation sequencer 312 associated with translation structure(s) 310 handles invalidation of effective-to-real translation entries held within translation structure(s) 310 and manages such invalidations relative to memory-referent instructions in-flight in processor core 200.

Processor core 200 additionally includes various storage facilities shared by the multiple hardware threads supported by processor core 200. The storage facilities shared by the multiple hardware threads include an L1 store queue (STQ) 304 that temporarily buffers store and synchronization requests generated by execution of corresponding store and synchronization instructions by execution unit(s) 300. Because L1 cache 302 is a store-through cache, meaning that coherence is fully determined at a lower level of cache hierarchy (e.g., at L2 cache 230), requests flow through L1 STQ 304 and then pass via bus 318 to L2 cache 230 for processing. The storage facilities of processor core 200 shared by the multiple hardware threads additionally include a load miss queue (LMQ) 306 that temporarily buffers load requests that miss in L1 cache 302. Because such load requests have not yet been satisfied, they are subject to hitting the wrong memory page if the address translation entry utilized to obtain the target real addresses of the load requests are invalidated before the load requests are satisfied. Consequently, if a PTE or other translation entry is to be invalidated, any load requests in LMQ 306 that depends on that translation entry has to be drained from LMQ 306 and be satisfied before the effective address translated by the relevant translation entry can be reassigned. The shared storage facilities in processor core 200 additionally include a load reorder queue (LRQ) 307 that buffers load-type requests of processor core 200 for purposes of reordering the load-type requests as needed to satisfy the chosen memory model of processor core 200.

Still referring to FIG. 3A, L2 cache 230 includes an L2 array 332 and a L2 directory 334 of the contents of L2 array 332. Assuming L2 array 332 and L2 directory 334 are set associative as is conventional, storage locations in system memories 108 are mapped to particular congruence classes within L2 array 332 utilizing predetermined index bits within the system memory (real) addresses. The particular memory blocks stored within the cache lines of L2 array 332 are recorded in L2 directory 334, which contains one directory entry for each cache line. While not expressly depicted in FIG. 3A, it will be understood by those skilled in the art that each directory entry in cache directory 334 includes various fields, for example, a tag field that identifies the real address of the memory block held in the corresponding cache line of L2 array 332, a state field that indicates the coherency state of the cache line, an LRU (Least Recently Used) field indicating a replacement order for the cache line with respect to other cache lines in the same congruence class, and inclusivity bits indicating whether the memory block is held in the associated L1 cache 302.

L2 cache 230 additionally includes an L2 STQ 320 that receives storage-modifying requests and synchronization requests from L1 STQ 304 via interface 318 and buffers such requests. It should be noted that L2 STQ 320 is a unified store queue that buffers requests for all hardware threads of the affiliated processor core 200. Consequently, all of the threads' store requests, TLBIE requests and associated synchronization requests flows through L2 STQ 320. Although in most embodiments L2 STQ 320 includes multiple entries, L2 STQ 320 is required to function in a deadlock-free manner regardless of depth (i.e., even if implemented as a single entry queue). To this end, L2 STQ 320 is coupled by an interface 321 to associated sidecar logic 322, which includes one request-buffering entry (referred to herein as a "sidecar") 324 per hardware thread supported by the affiliated processor core 200. As such, the number of sidecars 324 is unrelated to the number of entries in L2 STQ 320. As described further herein, use of sidecars 324 allows potentially deadlocking requests to be removed from L2 STQ 320 so that no deadlocks occur during invalidation of a translation entry.

L2 cache 230 further includes dispatch/response logic 336 that receives local load and store requests initiated by the affiliated processor core 200 via buses 327 and 328, respectively, and remote requests snooped on local interconnect 114 via bus 329. Such requests, including local and remote load requests, store requests, TLBIE requests, and associated synchronization requests, are processed by dispatch/response logic 336 and then dispatched to the appropriate state machines for servicing.

In the illustrated embodiment, the state machines implemented within L2 cache 230 to service requests include multiple Read-Claim (RC) machines 342, which independently and concurrently service load-type (LD) and store-type (ST) requests received from the affiliated processor core 200. In order to service remote memory access requests originating from processor cores 200 other than the affiliated processor core 200, L2 cache 230 also includes multiple snoop (SN) machines 344. Each snoop machine 344 can independently and concurrently handle a remote memory access request snooped from local interconnect 114. As will be appreciated, the servicing of memory access requests by RC machines 342 may require the replacement or invalidation of memory blocks within L2 array 332 (and L1 cache 302). Accordingly, L2 cache 230 also includes CO (castout) machines 340 that manage the removal and writeback of memory blocks from L2 array 332.

In the depicted embodiment, L2 cache 230 additionally includes multiple translation snoop (TSN) machines 346, which are utilized to service TLBIE requests and associated synchronization requests. It should be appreciated that in some embodiments, TSN machines 346 can be implemented in another sub-unit of a processing unit 104, for example, a non-cacheable unit (NCU) (not illustrated) that handles non-cacheable memory access operations. In at least one embodiment, the same number of TSN machines 346 is implemented at each L2 cache 230 in order to simplify implementation of a consensus protocol (as discussed further herein) that coordinates processing of multiple concurrent TLBIE requests within data processing system 100.

TSN machines 346 are all coupled to an arbiter 348 that selects requests being handled by TSN machines 346 for transmission to translation sequencer 312 in processor core 200 via bus 350. In at least some embodiments, bus 350 is implemented as a unified bus that transmits not only requests of TSN machines 346, but also returns data from the L2 cache 230 to processor core 200, as well as other operations. It should be noted that translation sequencer 312 must accept requests from arbiter 348 in a non-blocking fashion in order to avoid deadlock.

Figure 3B:
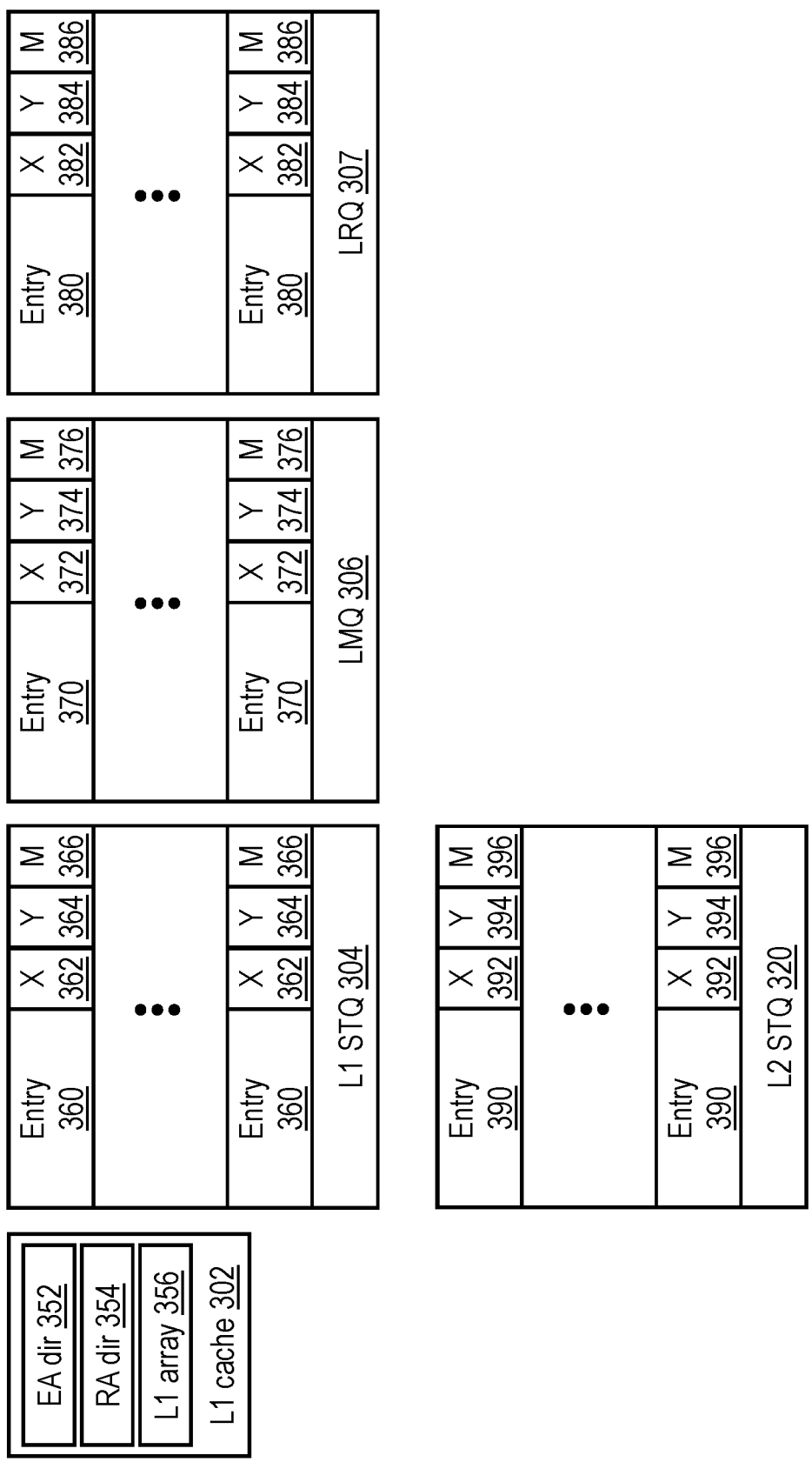
FIG. 3B is a more detailed view of the certain data structures in the processor core and L2 cache of FIG. 3A.

With reference now to FIG. 3B, there is illustrated a more detailed view of the certain data structures in the processor core 200 and L2 cache 230 of FIG. 3A. In the depicted example, L1 cache 302 in processor core 200 includes a L1 array 356 for buffering cache lines of data likely to be read and/or written by memory-referent instructions executed by execution unit(s) 300. In a preferred embodiment, L1 array 356 has a set-associative organization including a plurality of congruence classes, each including multiple entries or "ways" for buffering cache lines. In accordance with the present invention, L1 cache 302 implements an allocation policy in which an entry in L1 array 356 is allocated on a miss of either a LD request or ST request of the processor core 200.

L1 cache 302 includes two directories, an effective address (EA) directory 352 and a real address directory 354, each of which employs a set-associative organization and includes a respective directory entry corresponding to each entry in L1 array 356. Entries in EA directory 352 specifies addresses associated with entries allocated in L1 array 356 in terms of effective addresses utilized by processor core 200, while entries in RA directory 354 specify the addresses associated with the entries in L1 array 356 in terms of real addresses utilized in L2 cache 230 and system memory 108. In a preferred embodiment, each entry of EA directory 352 additionally records a state of the corresponding entry in L1 array 356, which can be any of the following states: "invalid", "valid without data", and "valid with data." The "invalid" state is assigned to L1 cache entries that are currently unallocated, the "valid without data" state is assigned to L1 cache entries that have been allocated based on a miss in EA directory 352 of a ST request of the processor core 200, and the "valid with data" state is assigned to L1 cache entries that have been allocated due to a miss in EA directory 352 of a LD request of the processor core 200 or for which a LD request of the processor core 200 hits in EA directory 352 in the "valid without data" state.

L1 STQ 304 includes one or more entries 360 for buffering ST requests of the processor core 200. Each ST request may include, for example, a transaction type indicating the type of the ST request (i.e., store, store-conditional, etc.), an indication of the initiating processor core 200 and hardware thread that issued the ST request, and the store data. In association with each ST request, L1 STQ 304 includes X and Y coordinate fields 362, 364, which respectively identify the congruence class and way of the entry in L1 array 356 presently associated with the target address, as well as a marking (M) field 366, which, when set (e.g., to 1), identifies the associated ST request as having to be drained from processing unit 104 prior to completion of a pending TLBIE request. As will be appreciated, use of XY coordinates as a pointer to a directory entry in L1 cache 302 implicitly indicates the target address of the ST request without the expense of keeping the additional bits required to explicitly specify the target address.

As indicated, L2 STQ 320 similarly includes one or more entries 390 for buffering ST requests of the processor core 200. In association with each ST request, L2 STQ 320 maintains X and Y coordinate fields 392, 394, which respectively identify the congruence class and way of the directory entry in L1 cache 302 presently storing with the target address, as well as a marking (M) field 396, which, when set (e.g., to 1), identifies the associated ST request as having to be drained from processing unit 104 prior to completion of a pending TLBIE request.

FIG. 3B further illustrates that LMQ 306 and LRQ 307 are also constructed similarly to L1 STQ 304. Each of LMQ 306 and 307 includes one or more entries 370 or 380 for buffering LD requests of the processor core 200. Each LD request may include, for example, a transaction type indicating the type of the LD request and an indication of the initiating processor core 200 and hardware thread that issued the LD request. In association with each LD request enqueued therein, LMQ 306 and LRQ 307 maintains X and Y coordinate fields 372 and 374 or 382 and 384 and a marking (M) field 376 or 386 as discussed above.

Figure 3C:
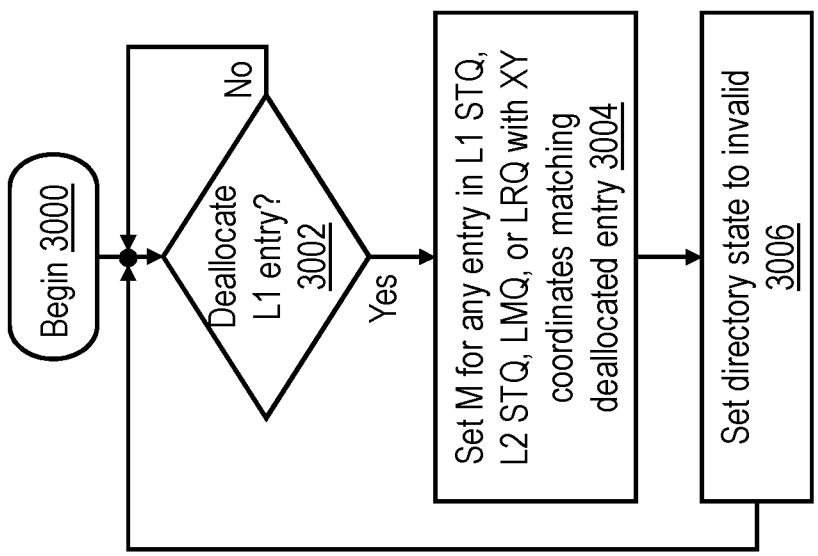
FIG. 3C is a high-level logical flowchart of an exemplary method of marking in-flight memory-referent requests in response to deallocation of an L1 cache entry in accordance with one embodiment.

Referring now to FIG. 3C, there is depicted a high-level logical flowchart of an exemplary method of marking in-flight memory-referent requests in response to deallocation of an L1 cache entry in accordance with one embodiment. The process of FIG. 3C begins at block 3000 and then proceeds to block 3002, which illustrates L1 cache 302 determining whether or not to deallocate an entry in L1 array 356 that is currently allocated. For example, L1 cache 302 may determine to deallocate an entry in response to a miss of a LD request or ST request of the processor core 200, as discussed below with reference to block 3016 of FIG. 3D and block 3056 of FIG. 3E.

If L1 cache 302 does not determine to deallocate an entry at block 3002, the process simply iterates at block 3002. If, however, L1 cache 302 determines at block 3002 to deallocate a currently allocated entry, L1 cache 302 sets the M field 366, 376, 386, or 396 of an entry in any of data structures 304, 306, 307, or 320 having XY coordinates (specified in fields 362-364, 372-374, 382-384, or 392-394) matching those of the deallocated entry. L1 cache 302 marks these memory access requests for draining from processing unit 104 prior to completion of any subsequent TLBIE request because L1 cache 302, which serves as a proxy for tracking target addresses relevant to TLBIE requests, will no longer be tracking the address associated with the entry following deallocation. Following block 3004, L1 cache 302 deallocates the entry by setting the associated state in EA directory 352 to the invalid state (block 3006). The process of FIG. 3C then returns to block 3002, which has been described.

Figure 3D:
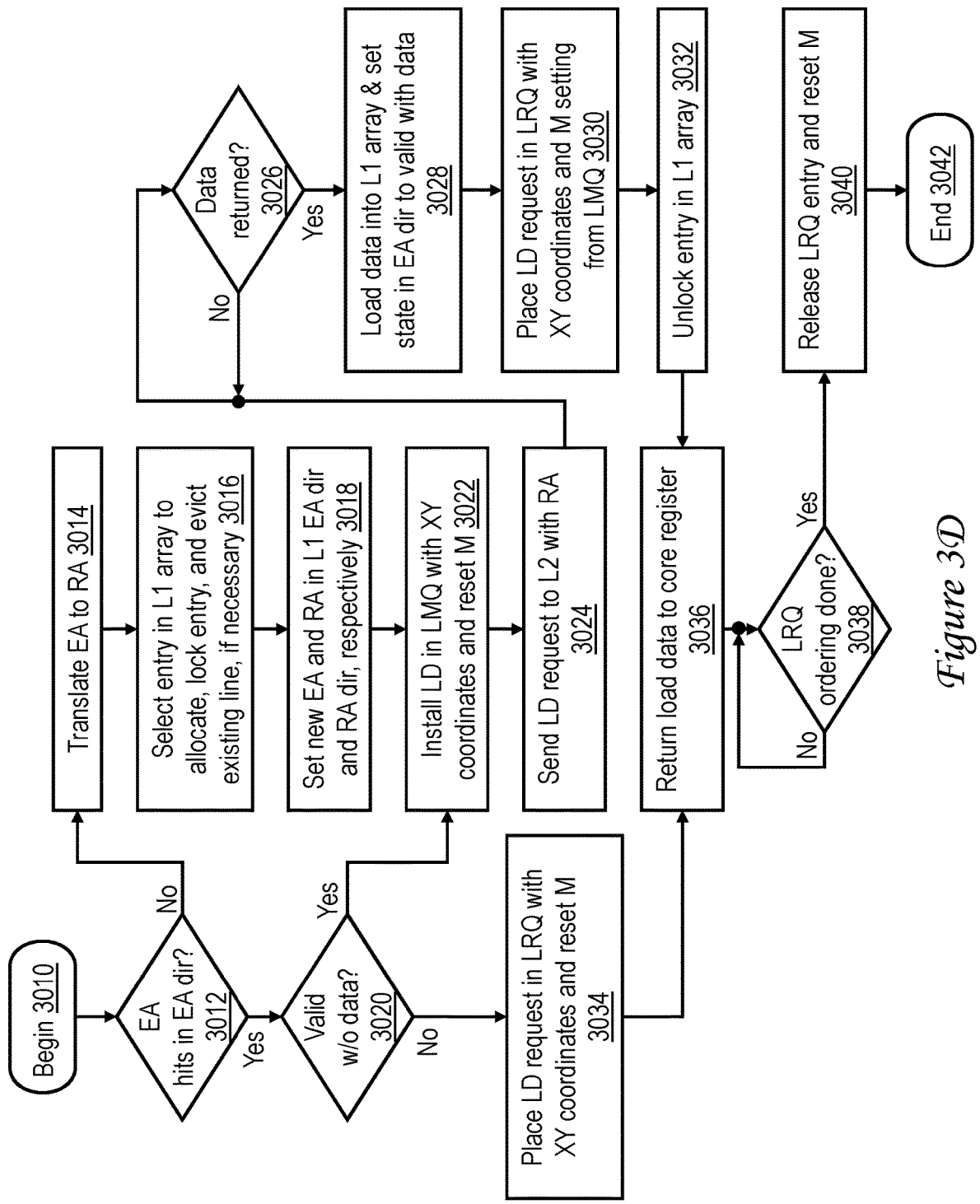
FIG. 3D is a high-level logical flowchart of an exemplary method by which a processor core of a data processing system processes a load-type request in accordance with one embodiment.

With reference now to FIG. 3D, there is illustrated a high-level logical flowchart of an exemplary method by which a processor core 200 of a data processing system 100 processes a LD request in accordance with one embodiment. It will be appreciated that multiple instances of the illustrated process may be performed in a temporally overlapping manner by the same and/or different processor cores 200.

The process of FIG. 3D begins at block 3010, for example, responsive to execution unit(s) 300 executing a load-type instruction to generate a LD request and to calculate a target EA of data to be loaded into registers 309 by the LD request. At block 3012, L1 cache 302 determines whether or not the target EA hits in EA directory 352. If so, meaning a directory entry records one of the "valid with data" and "valid without data" states in association with the target EA, the process of FIG. 3D passes to block 3020, which is described below. If, however, L1 cache 302 determines at block 3012 that the EA misses in EA directory 352, the process proceeds to block 3014.

Block 3014 illustrates MMU 308 translating the target EA to a target RA by reference to translation structure(s) 310 if the target EA hits in translation structure(s) 310 or by utilizing a walk of page frame table 220 if the target EA misses in translation structure(s) 310. Based on the miss detected at block 3012, L1 cache 302 selects an entry in L1 array 356 to allocate to the LD request, locks the entry to make the entry unavailable for allocation to other memory access requests, and evicts any existing cache line in the allocated entry (block 3016). The process of deallocating the existing cache line has been described above with reference to FIG. 3C. L1 cache 302 then records, within EA directory 352 and RA directory 354, respectively, the target EA and target RA of the LD request (block 3018). Processor core 200 installs the LD request in an available entry 370 of LMQ 306, sets the associated X field 372 and Y field 374 to indicate the relevant entry in L1 cache 302, and resets M field 376 (e.g., to 0) to indicate that the LD request is not marked for draining (block 3022). While the LD request remains pending in LMQ 306 (and later LRQ 307), processor core 200 may update (i.e., set) the associated M field based on receipt and processing of a TLBIE request, as described below with reference to FIGS. 9A-9B. Processor core 200 additionally sends the LD request and the target RA to L2 cache 230 for servicing (block 3024).

As indicated at block 3026, processor core 200 then awaits return from L2 cache 230 of a cache line containing the data requested by the LD request. In response to receipt of the cache line from L2 cache 230, processor core 200 loads the cache line into the entry of L1 array 356 allocated to the LD request and sets the associated state in EA directory 352 to the "valid with data" state (block 3028). Processor core 200 additionally transfers the LD request and its associated XY coordinates and M field value from LMQ 306 to an available entry 380 and associated fields 382, 384, and 386 in LRQ 307, freeing the LMQ entry 370 for reuse (block 3030). Processor core 200 also unlocks the entry in L1 array 356 (block 3032) and installs the requested portion of the returned cache line into registers 309 (block 3036).

The process of FIG. 3D then awaits at block 3038 while processor core 200 enforces any ordering of the LD request with respect to other memory-referent requests or barrier requests required by the memory model of data processing system 100. When any such ordering is complete, processor core 200 releases the LMQ entry 380 and resets the associated M field 386 (block 3040). Thereafter, the process of FIG. 3D ends at block 3042.

Referring now to block 3020, if the target EA of the LD request hits in EA directory 352, processor core 200 determines whether or not the state indicated for the target EA by EA directory 352 is the "valid without data" state. If so, the process proceeds to block 3022 and following blocks, which have described. If, however, processor core 200 determines at block 3020 that the state indicated for the target EA of the LD request by EA directory 352 is the "valid with data" state, the process instead passes to block 3034, which illustrates processor core 200 placing the LD request into an available entry 380 in LRQ 307, setting in associated fields 382, 384 the XY coordinates of the relevant entry in L1 cache 302, and resetting the associated M field 386 (block 3034). Following block 3034, the process of FIG. 3D proceeds to block 3036, which has been described.

Figure 3E:
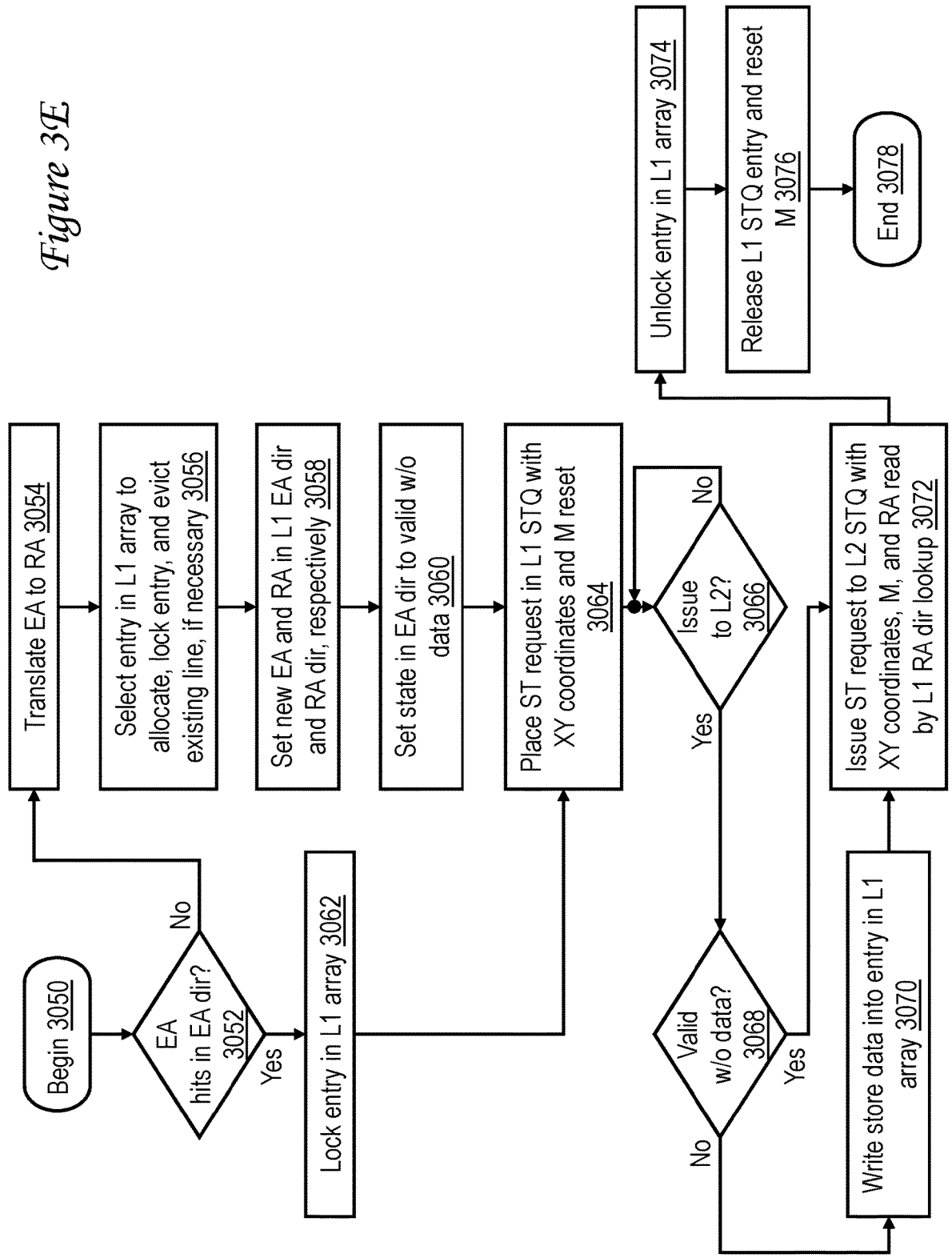
FIG. 3E is a high-level logical flowchart of an exemplary method by which a processor core of a data processing system processes a store-type request in accordance with one embodiment.

Referring now to FIG. 3E, there is depicted a high-level logical flowchart of an exemplary method by which a processor core 200 of data processing system 100 processes a store-type request in accordance with one embodiment. It will be appreciated that multiple instances of the process of FIG. 3E may be performed in a temporally overlapping manner in the same and/or different processor cores 200.

The process of FIG. 3E begins at block 3050, for example, responsive to execution unit(s) 300 executing a store-type instruction to generate a ST request and calculate a target EA of data to be updated by the ST request. At block 3052, L1 cache 302 determines whether or not the target EA hits in EA directory 352. If so, meaning a directory entry records one of the "valid with data" and "valid without data" states in association with the target EA, the process of FIG. 3E passes to block 3062, which illustrates processor core 200 locking the associated entry in L1 array 356 to make the entry unavailable for allocation to other memory access requests. The process then passes to block 3064, which is described below. If, however, L1 cache 302 determines at block 3052 that the EA misses in EA directory 352, the process proceeds to block 3054.

Block 3054 illustrates MMU 308 translating the target EA of the ST request to a target RA by reference to translation structure(s) 310 if the target EA hits in translation structure(s) 310 or by utilizing a walk of page frame table 220 if the target EA misses in translation structure(s) 310. Based on the miss detected at block 3052, L1 cache 302 selects an entry in L1 array 356 to allocate to the ST request, locks the entry to make the entry unavailable for allocation to other memory access requests, and evicts any existing cache line in the allocated entry (block 3056). The deallocation of the existing cache line can be handled as described above with reference to FIG. 3C. L1 cache 302 then records, within EA directory 352 and RA directory 354, respectively, the target EA and target RA of the ST request (block 3058) and sets the state recorded in EA directory 352 for the allocated L1 entry to the "valid without data" state (block 3060).

At block 3064, processor core 200 installs the ST request in an available entry 360 of L1 STQ 304, sets the associated X field 362 and Y field 364 to indicate the relevant entry in L1 cache 302, and resets M field 366 (e.g., to 0) to indicate that the ST request is not marked for draining. While the ST request remains pending in L1 STQ 304 (and later L2 STQ 320), processor core 200 may update (i.e., set) the associated M field based on receipt and processing of a TLBIE request, as described below with reference to FIGS. 9A-9B.

Processor core 200 then determines at block 3066 whether or not to issue the ST request to L2 cache 230 for servicing. For example, in some embodiments, processor core 200 may wait to issue the ST request until all older ST or barrier requests, if any, in L1 STQ 304 have been issued to L2 cache 230. In response to a negative determination at block 3066, the process of FIG. 3E iterates at block 3066. If, however, processor core 200 determines at block 3066 to issue the ST request to L2 cache 230, processor core 200 performs a lookup in EA directory 352 and in RA directory 354 at issue time utilizing the XY coordinates buffered in association with the ST request. Based on the results of the lookup in EA directory 352, the processor core 200 determines if the state indicated by EA directory 356 is the "valid without data" state (block 3068). If not (meaning the state indicated by EA directory 356 is the "valid with data" state), processor core 200 writes the store data of the ST request into the entry in L1 array 356 identified by the XY coordinates (block 3070). Following block 3070 or following an affirmative determination at block 3068, processor core 200 issues the ST request to L2 cache 230 by transferring the ST request and its associated XY coordinates and M field value from L1 STQ 304 to an available entry 390 and associated fields 392, 394, and 396 in L2 STQ 320 (block 3072). As noted in block 3072, processor core 200 additionally loads into the L2 STQ entry 390 the target RA obtained from the lookup in RA directory 354.

Following block 3072, processor core 200 unlocks the entry in L1 array 356 (block 3074). In addition, processor core 200 releases the L1 STQ entry 360 allocated to the ST request and resets the associated M field 366, thus freeing the L1 STQ entry 360 for reallocation (block 3076). Thereafter, the process of FIG. 3E ends at block 3078.

Figure 3F:
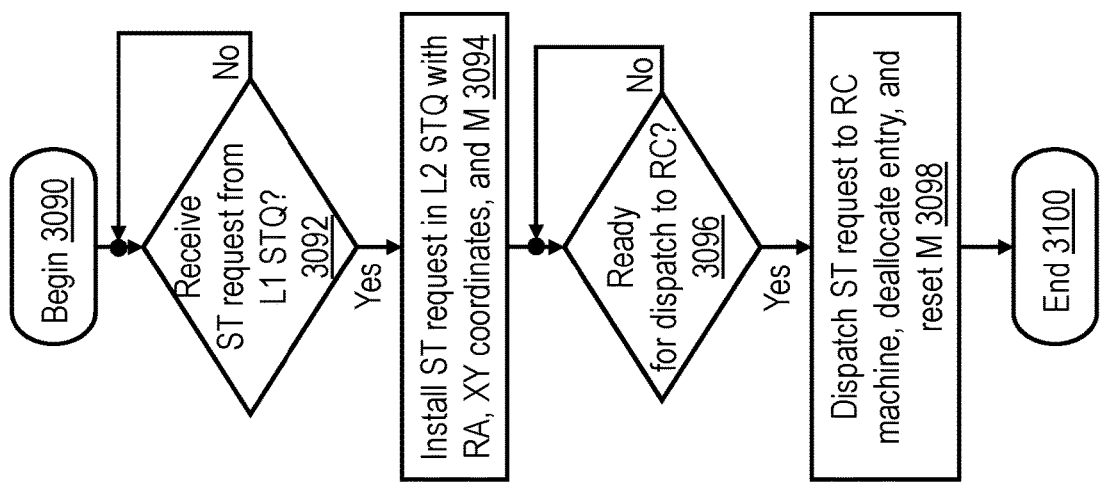
FIG. 3F is a high-level logical flowchart of an exemplary method by which a store-type request is processed in an L2 store queue (STQ) in accordance with one embodiment.

Referring now to FIG. 3F, there is depicted a high-level logical flowchart of an exemplary method by which a store-type request is processed in an L2 store queue (STQ) 320 in accordance with one embodiment. The process begins at block 3090 and then proceeds to block 3092, which illustrates L2 cache 230 monitoring for receipt of a ST request and associated target RA from L1 STQ 304. In response to receipt of a ST request and associated target RA from L1 STQ 304, L2 cache 230 installs the ST request and target RA in an available entry 390 in L2 STQ 320 and places the associated XY coordinates and M field value received from L1 STQ 304 into associated fields 392, 394, and 396 (block 3094). L2 cache 230 then determines at block 3096 whether or not to dispatch the ST request from L2 STQ 320 to an RC machine 342 for servicing. For example, in some embodiments, processor core 200 may wait to dispatch the ST request until all older ST or barrier requests, if any, in L2 STQ 320 have been removed. In response to a negative determination at block 3096, the process of FIG. 3F iterates at block 3096. If, however, L2 cache 230 determines at block 3096 to dispatch the ST request from L2 STQ 320, L2 cache 230 dispatches the ST request to an available RC machine 342, deallocates the L2 STQ entry 390 that was allocated to the ST request, and resets the associated M field 396. Thereafter, the process of FIG. 3F ends at block 3100.

Referring now to FIG. 4A, there is depicted a first exemplary translation entry invalidation instruction sequence 400 that may be executed by a processor core 200 of data processing system 100 in accordance with one embodiment. The purpose of instruction sequence 400 is to: (a) disable a translation entry (e.g., PTE 222) in page frame table 220 so that the translation entry does not get reloaded by any MMU 308 of data processing system 100, (b) invalidate any copy of the translation entry (or other translation entry that translates the same effective address as the translation entry) cached by any processor core 200 in data processing system 100, and (c) drain all the outstanding memory access requests that depend on the old translation entry before the effective address is re-assigned. If the translation were updated before the store requests that depend on the old translation entry drain, the store requests may corrupt the memory page identified by old translation entry. Similarly, if load requests that depend on the old translation entry and that miss L1 cache 302 were not satisfied before the translation is reassigned, the load requests would read data from a different memory page than intended and thus observe data not intended to be visible to the load requests.

Instruction sequence 400, which may be preceded and followed by any arbitrary number of instructions, begins with one or more store (ST) instructions 402. Each store instruction 402, when executed, causes a store request to be generated that, when propagated to the relevant system memory 108, marks a target PTE 222 in page frame table 220 as invalid. Once the store request has marked the PTE 222 as invalid in page frame table 220, MMUs 308 will no longer load the invalidated translation from page frame table 220.

Following the one or more store instructions 402 in instruction sequence 400 is a heavy weight synchronization (i.e., HWSYNC) instruction 404, which is a barrier that ensures that the following TLBIE instruction 406 doesn't get reordered by processor core 200 such that it executes in advance of any of store instruction(s) 402. Thus, HWSYNC instruction 404 ensures that if a processor core 200 reloads a PTE 222 from page frame table 220 after TLBIE instruction 406 invalidates cached copies of the PTE 222, the processor core 200 is guaranteed to have observed the invalidation due to a store instruction 402 and therefore will not use or re-load the target PTE 222 into translation structure(s) 310 until the effective address translated by the target PTE 222 is re-assigned and set to valid.

Following HWSYNC instruction 404 in instruction sequence 400 is at least one TLBIE instruction 406, which when executed generates a corresponding TLBIE request that invalidates any translation entries translating the target effective address of the TLBIE request in all translation structures 310 throughout data processing system 100. The one or more TLBIE instructions 406 are followed in instruction sequence 400 by a translation synchronization (i.e., TSYNC) instruction 408 that ensures that, prior to execution of the thread proceeding to succeeding instructions, the TLBIE request generated by execution of TLBIE instruction 406 has finished invalidating all translations of the target effective address in all translation structures 310 throughout data processing system 100 and all prior memory access requests depending on the now-invalidated translation have drained.

Instruction sequence 400 ends with a second HWSYNC instruction 410 that enforces a barrier that prevents any memory-referent instructions following HWSYNC instruction 410 in program order from executing until TSYNC instruction 406 has completed its processing. In this manner, any younger memory-referent instruction requiring translation of the target effective address of the TLBIE request will receive a new translation rather than the old translation invalidated by TLBIE request. It should be noted that HWSYNC instruction 410 does not have any function directly pertaining to invalidation of the target PTE 222 in page frame table, the invalidation of translation entries in translation structures 310, or draining of memory-referent instructions that depend on the old translation.

To promote understanding of the inventions disclosed herein, the progression of a TLBIE instruction 406 and the TLBIE request generated therefrom are described from inception to completion with reference to FIGS. 5-10. FIGS. 11 and 12 additionally depict the progression of TSYNC instruction 408 and its corresponding TSYNC request, which ensure that the invalidation requested by the TLBIE request has completed on all snooping processor cores 200.

Figure 5:
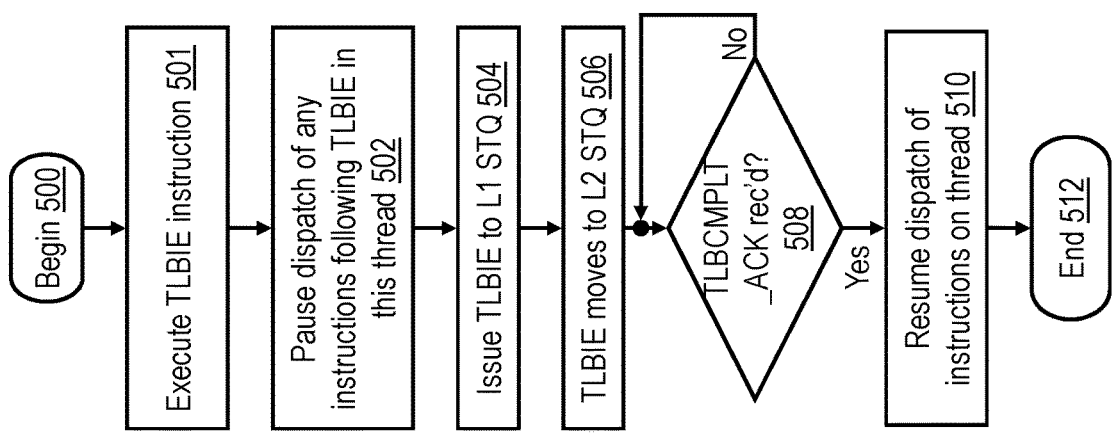
FIG. 5 is a high-level logical flowchart of an exemplary method by which a processor core of a multiprocessor data processing system processes a translation entry invalidation instruction in accordance with one embodiment.

Referring first to FIG. 5, there is illustrated a high-level logical flowchart of an exemplary method by which an initiating processor core 200 of a multiprocessor data processing system 100 processes a translation entry invalidation (e.g., TLBIE) instruction in accordance with one embodiment. The illustrated process represents the processing performed in a single hardware thread, meaning that multiple of these processes can be performed concurrently (i.e., in parallel) on a single processor core 200, and further, that multiple of these processes can be performed concurrently on various different processing cores 200 throughout data processing system 100. As a result, multiple different address translation entries buffered in the various processor cores 200 of data processing system 100 can be invalidated by different initiating hardware threads in a concurrent manner.

The illustrated process begins at block 500 and then proceeds to block 501, which illustrates execution of a TLBIE instruction 406 in an instruction sequence 400 by execution unit(s) 300 of a processor core 200. Execution of TLBIE instruction 406 determines a target effective address for which all translation entries buffered in translation structure(s) 310 throughout data processing system 100 are to be invalidated. In response to execution of TLBIE instruction 406, processor core 200 pauses the dispatch of any additional instructions in the initiating hardware thread because in the exemplary embodiment of FIG. 3A sidecar logic 322 includes only a single sidecar 324 per thread, meaning that at most one TLBIE request per thread can be active at a time. In other embodiments having multiple sidecars 324 per thread, multiple concurrently active TLBIE requests per thread can be supported.

At block 504, a TLBIE request corresponding to TLBIE instruction 406 is generated and issued to L1 STQ 304. The TLBIE request may include, for example, a transaction type indicating the type of the request (i.e., TLBIE), the effective address for which cached translations are to be invalidated, and an indication of the initiating processor core 200 and hardware thread that issued the TLBIE request. Processing of requests in L1 STQ 304 progresses, and the TLBIE request eventually moves from L1 STQ 304 to L2 STQ 320 via bus 318 as indicated at block 506. The process then proceeds to block 508, which illustrates that the initiating processor core 200 continues to refrain from dispatching instructions within the initiating hardware thread until it receives a TLBCMPLT_ACK signal from the storage subsystem via bus 325, indicating that processing of the TLBIE request by the initiating processor core 200 is complete. (Generation of the TLBCMPLT_ACK signal is described below with reference to block 1010 of FIG. 10.) It should also be noted that because dispatch of instructions within the initiating thread is paused, there can be no contention for the sidecar 324 of the initiating thread by a TSYNC request corresponding to TSYNC instruction 408, as, for any given thread, only one of the two types of requests can be present in L2 STQ 320 and sidecar logic 322 at a time.

In response to a determination at block 508 that a TLBCMPLT_ACK signal has been received, the process proceeds from block 508 to block 510, which illustrates processor core 200 resuming dispatch of instructions in the initiating thread; thus, release of the thread at block 510 allows processing of TSYNC instruction 408 (which is the next instruction in instruction sequence 400) to begin as described below with reference to FIG. 11. Thereafter, the process of FIG. 5 ends at block 512.

Figure 6:
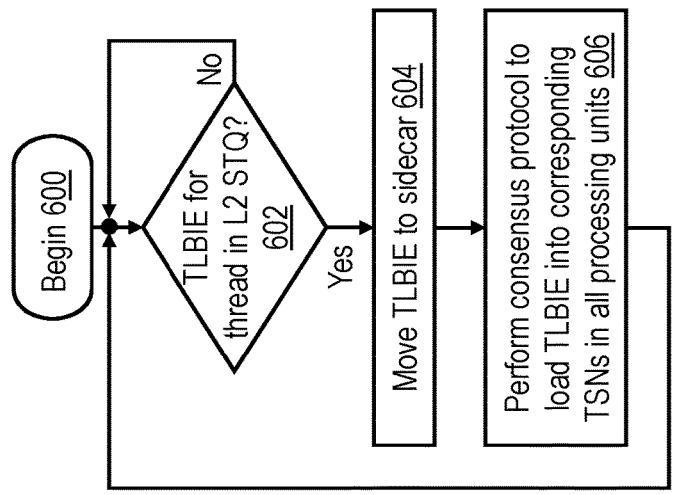
FIG. 6 is a high-level logical flowchart of an exemplary method by which sidecar logic of a processing unit processes a translation entry invalidation request in accordance with one embodiment.

Referring now to FIG. 6, there is depicted a high-level logical flowchart of an exemplary method by which sidecar logic 322 of an L2 cache 230 processes a translation entry invalidation (e.g., TLBIE) request of a hardware thread of the affiliated processor core 200 in accordance with one embodiment. The process of FIG. 6 is performed on a per-thread basis.

The process of FIG. 6 begins at block 600 and then proceeds to block 602, which illustrates sidecar logic 322 determining whether or not a TLBIE request of a hardware thread of the affiliated processor core 200 has been loaded into L2 STQ 320. If not, the process iterates at block 602. However, in response to a determination that a TLBIE of a hardware thread of the affiliated processor core 200 has been loaded into L2 STQ 320, sidecar logic 322 removes the TLBIE request from L2 STQ 320 and moves the TLBIE request via interface 321 into the sidecar 324 corresponding to the initiating thread (block 604). Removal of the TLBIE request from L2 STQ 320 ensures that no deadlock occurs due to inability of L2 STQ 320 to receive incoming requests from the associated processor core 200 and enables such requests to flow through L2 STQ 320.

At block 606, sidecar 324 participates in a consensus protocol (which may be conventional) via interface 326 and local interconnect 114 to ensure that one (and only one) TSN machine 346 in each and every L2 cache 230 receives its TLBIE request. In addition, the consensus protocol ensures that the various TSN machines 346 only take action to service the TLBIE request once all of the corresponding TSN machines 346 have received the TLBIE request. Thereafter, the process returns to block 602, which has been described.

Figure 7:
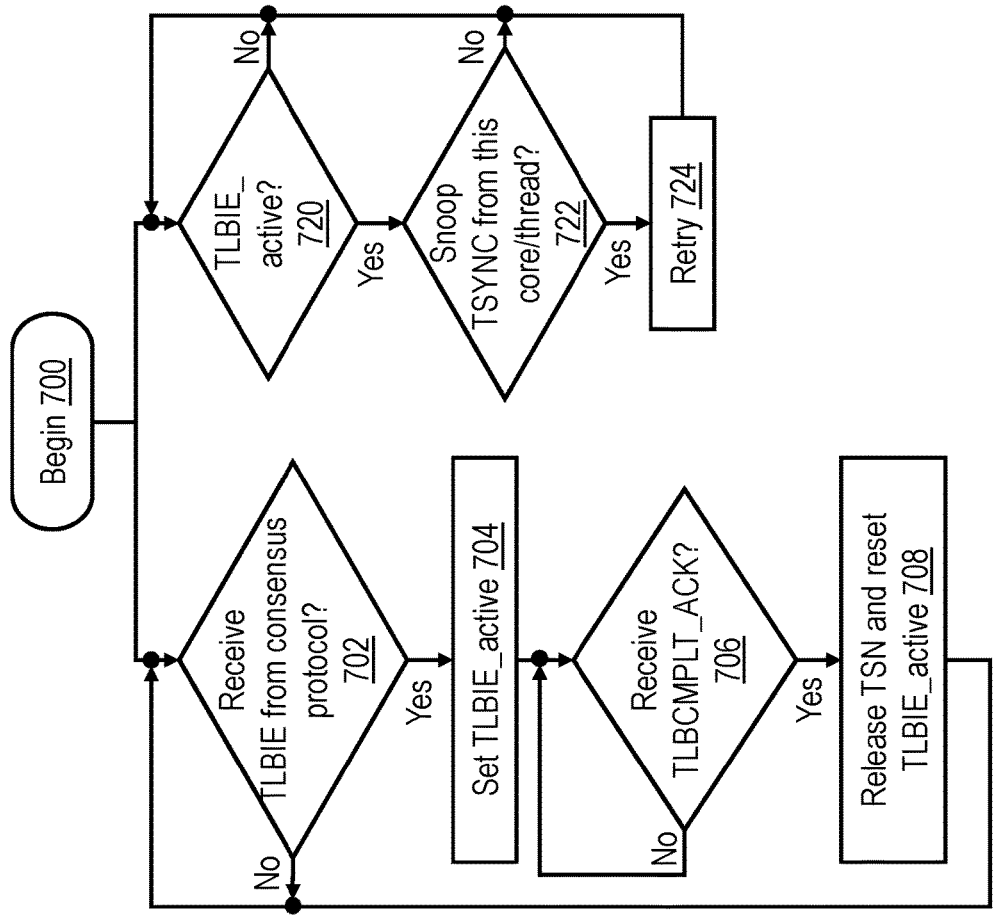
FIG. 7 is a high-level logical flowchart of an exemplary method by which a snooper of a processing unit handles translation entry invalidation requests and translation synchronization requests in accordance with one embodiment.

With reference now to FIG. 7, there is illustrated a high-level logical flowchart of an exemplary method by which TSN machines 346 processes TLBIE requests and TSYNC requests in accordance with one embodiment. The illustrated process is independently and concurrently performed for each TSN machine 346.

The process begins at block 700 and then proceeds to blocks 702 and 720. Block 702 and succeeding block 704 illustrate that in response to receipt of a TLBIE request via the consensus protocol a TSN machine 346 buffers the TLBIE request and assumes a TLBIE_active state. The TLBIE request, which is broadcast over the system fabric 110, 114 to the L2 cache 230 of the initiating processor core 200 and those of all other processor cores 200 of data processing system 100 at block 606 of FIG. 6, is received by an L2 cache 230 via interface 329, processed by dispatch/response logic 336 and then assigned to the TSN machine 346. As noted above, in a preferred embodiment, the consensus protocol enforces the condition that the TLBIE request is allocated a TSN machine 346 in one L2 cache 230 only if a TSM machine 346 is similarly allocated to the TLBIE request by all other L2 caches 230. The TSN machine 346 assuming the TLBIE_active state informs the associated arbiter 348 that a TLBIE request is ready to be processed, as described further below with reference to block 802 of FIG. 8.

Block 706 illustrates TSN machine 346 remaining in the TLBIE_active state until processing of the TLBIE request by the associated processor core 200 (i.e., invalidation of the relevant translation entries in translation structure(s) 310 and draining of relevant memory-referent requests from processor core 200) is completed, as indicated by receipt of a TLBCMPLT_ACK signal via signal line 330. In response to receipt of the TLBCMPLT_ACK signal, the TLBIE_active state is reset, and the TSN machine 346 is released for reallocation (block 708). Thereafter, the process of FIG. 7 returns from block 708 to block 702, which has been described.

Referring now to blocks 720-724, a TSN machine 346 determines at block 720 if it is in the TLBIE_active state established at block 704. If not, the process iterates at block 720. If, however, the TSN machine 346 is in the TLBIE_active state established at block 704, the TSN machine 346 monitors to determine if a TSYNC request for the initiating hardware thread of its TLBIE request has been detected (block 722). If no TSYNC request is detected, the process continues to iterate at blocks 720-722. However, in response to a detection of a TSYNC request of the initiating hardware thread of its TLBIE request while TSN machine 346 is in the TLBIE_active state, TSN machine 346 provides a Retry coherence response via the system fabric 110, 114, as indicated at block 724. As discussed below with reference to block 1208 of FIG. 12, a Retry coherence response by any TSN snooper 346 handling the TLBIE request for the initiating hardware thread forces the TSYNC request to be reissued by the source L2 cache 230 and prevents the initiating hardware thread from progressing to HWSYNC instruction 410 until the TSYNC request completes without a Retry coherence response. The TSYNC request completes without a Retry coherence response when all processor cores 200 other than the initiating processor core 200 have completed their processing of the TLBIE request. (The TSYNC request is not issued by the initiating processor core 200 until it has completed processing the TLBIE request due to the dispatch of instructions being paused for processing of the TLBIE request, as discussed above with reference to block 508 of FIG. 5.)

Figure 8:
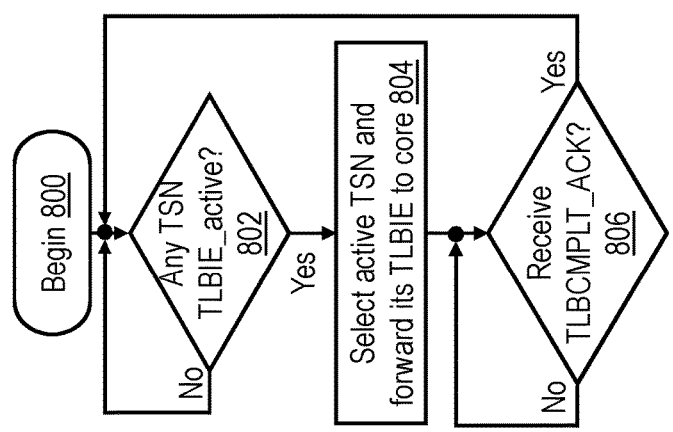
FIG. 8 is a high-level logical flowchart of an exemplary method by which an arbiter of a processing unit processes a translation entry invalidation request in accordance with one embodiment.

Referring now to FIG. 8, there is a high-level logical flowchart of an exemplary method by which an arbiter 348 of the L2 cache 230 processes a TLBIE request in accordance with one embodiment. The process begins at block 800 and then proceeds to block 802, which illustrates arbiter 348 determining whether or not any of its TSN machines 346 is in the TLBIE_active state. If not, the process of FIG. 8 iterates at block 802. However, in response to determining that one or more of its TSN machines 346 is in the TLBIE_active state, arbiter 348 selects one of the TSN machines 346 in the TLBIE_active state that has not been previously had its TLBIE request forwarded and transmits its TLBIE request via interface 350 to the translation sequencer 312 of the affiliated processor core 200 (block 804). To avoid deadlock, translation sequencer 312 is configured to accept TLBIE requests within a fixed time and not arbitrarily delay accepting a TLBIE request.

The process proceeds from block 804 to block 806, which depicts arbiter 348 awaiting receipt of a TLBCMPLT_ACK message indicating that the affiliated processor core 200 has, in response to the TLBIE request, invalidated the relevant translation entry or entries in translation structure(s) 310 and drained the relevant memory-referent requests that may have had their target addresses translated by the invalidated translation entries. Thus, at block 806, arbiter 348 is awaiting a TLBCMPLT_ACK message like both the initiating thread (block 508) and a TSN machine 346 in each of the L2 caches 230 (block 706). In response to receipt of a TLBCMPLT_ACK message at block 806, the process returns to block 802, which has been described. It should be noted that by the time the process returns to block 802, the previously selected TSN machine 346 will not still be in the TLBIE_active state for the already processed TLBIE request because the TLBIE_active state will have been reset as illustrated at blocks 706-708 before the process returns to block 802.

The process of FIG. 8 (and blocks 802 and 806 in particular) ensures that only one TLBIE request is being processed by the processor core 200 at a time. The serial processing of TLBIE requests by the processor core 200 eliminates the need to tag TLBCMPLT_ACK messages to associate them with TLBIE requests and simplifies instruction marking mechanisms, as discussed below with reference to FIGS. 9A-9B. Those skilled in the art will recognize, however, that in other embodiments the processor core 200 can be configured to service multiple TLBIE requests concurrently with some additional complexity.

Figure 9A:
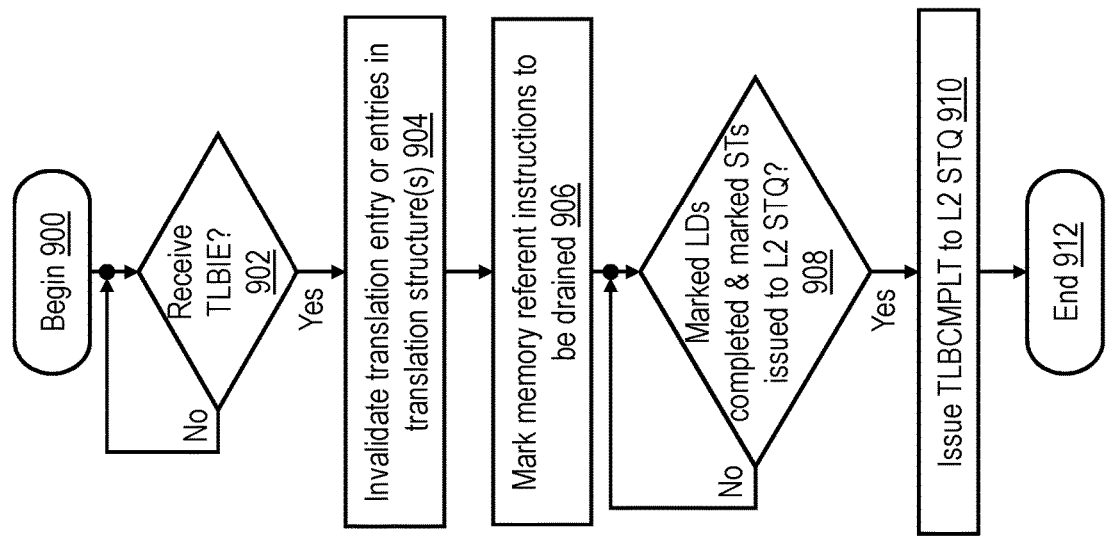
FIG. 9A is a high-level logical flowchart of an exemplary method by which a translation sequencer of a processor core processes a translation entry invalidation request in accordance with one embodiment.

With reference now to FIG. 9A, there is illustrated a high-level logical flowchart of an exemplary method by which a translation sequencer 312 of an initiating or snooping processor core 200 processes a TLBIE request in accordance with one embodiment. The process shown in FIG. 9A begins at block 900 and then proceeds to block 902, which illustrates translation sequencer 312 awaiting receipt of a TLBIE request forward by arbiter 348 as described above with reference to block 804 of FIG. 8. In response to receipt of a TLBIE request, translation sequencer 312 invalidates one or more translation entries (e.g., PTEs or other translation entries) in translation structure(s) 310 that translate the target effective address of TLBIE request (block 904). In addition, at block 906, translation sequencer 312 marks all memory-referent requests that are to be drained from the processor core 200. An exemplary technique for the marking depicted at block 906 is described below with reference to FIG. 9B.

The process of FIG. 9A proceeds from block 906 to block 908, which illustrates translation sequencer 312 waiting for the requests marked at block 906 to drain from processor core 200. In particular, translation sequencer 312 waits until all load requests marked at block 906 have had their requested data returned to processor core 200 and all store requests marked at block 906 have been issued to L2 STQ 320. In response to all marked requests draining from processor core 200, translation sequencer 312 inserts a TLBCMPLT request into L2 STQ 320 to indicate that servicing of the TLBIE request by translation sequencer 312 is complete (block 910). Thereafter, the process of FIG. 9A ends at block 912.

Figure 9B:
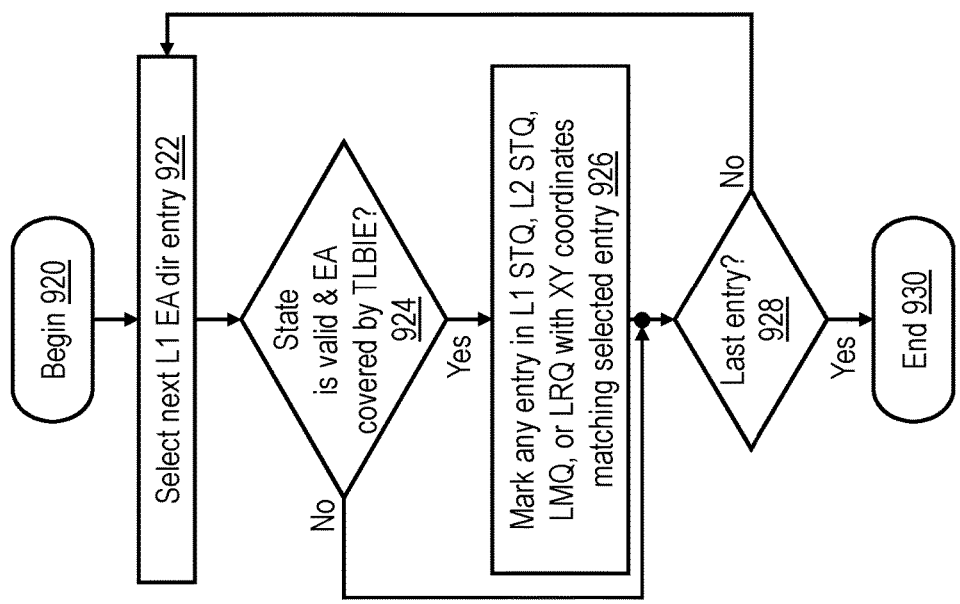
FIG. 9B is a more detailed flowchart of an exemplary method of marking in-flight memory-referent requests in the process of FIG. 9A.

With reference now to FIG. 9B, there is illustrated a more detailed flowchart of an exemplary method of marking in-flight memory-referent requests, for example, at block 906 of FIG. 9A. The process begins at block 920 and then proceeds to block 922, which illustrates translation sequencer 312 beginning a walk of L1 cache 302 by selecting a next (i.e., first) entry in EA directory 352. At block 924, translation sequencer 312 performs a lookup of the selected entry to determine whether the indicated state is a valid state (e.g., the "valid with data" state or "valid without data" state) and the EA indicated by the entry is covered by the range of addresses covered by the pending TLBIE request. In response to a negative determination at block 924, the process passes to block 928, which is described below. In response to translation sequencer 312 making an affirmative determination at block 924, translation sequencer 312 marks relevant memory-referent requests for draining by setting the M field 366, 376, 386, or 396 of any entry in any of data structures 304, 306, 307, or 320 having XY coordinates (specified in fields 362-364, 372-374, 382-384, or 392-394) matching those of the currently selected entry in EA directory 352. The process then passes to block 928.

Block 928 depicts translation sequencer 312 determining whether all entries in EA directory 352 have been processed. If so, the walk of L1 cache 302 is complete, and the process of FIG. 9B ends at block 930. However, in response to translation sequencer 312 determining at block 928 that the walk of L1 cache 302 is not complete, the process returns to block 922, representing translation sequencer 312 continuing the walk of L1 cache 302 by selecting a next entry in EA directory 352. The marking process shown in FIG. 9B continues iteratively until all relevant memory-referent requests have been precisely marked for draining by reference to EA directory 352.

Those skilled in the art will recognize that processing of a TLBIE request requires any in-flight memory referent request dependent on an invalidated address translation to be drained prior to successful completion of the TLBIE request. In accordance with the described embodiments, all in-flight memory referent requests of a processor core 200 are tagged with a pointer (e.g., XY coordinates) to a corresponding entry in the L1 cache 302 and, upon deallocation of such entry, marked for draining responsive to any TLBIE request. Based on this construction, an in-flight operation associated with a given effective address can be identified for marking by matching in the L1 cache, or if this is not possible due to prior eviction from the L1 cache of the line, the entry is preemptively marked at L1 deallocation. This allows the entries in L1 cache 302 serve as a proxy for marking any in-flight memory referent requests still having a valid corresponding entry in L1 cache 302.

Figure 10:
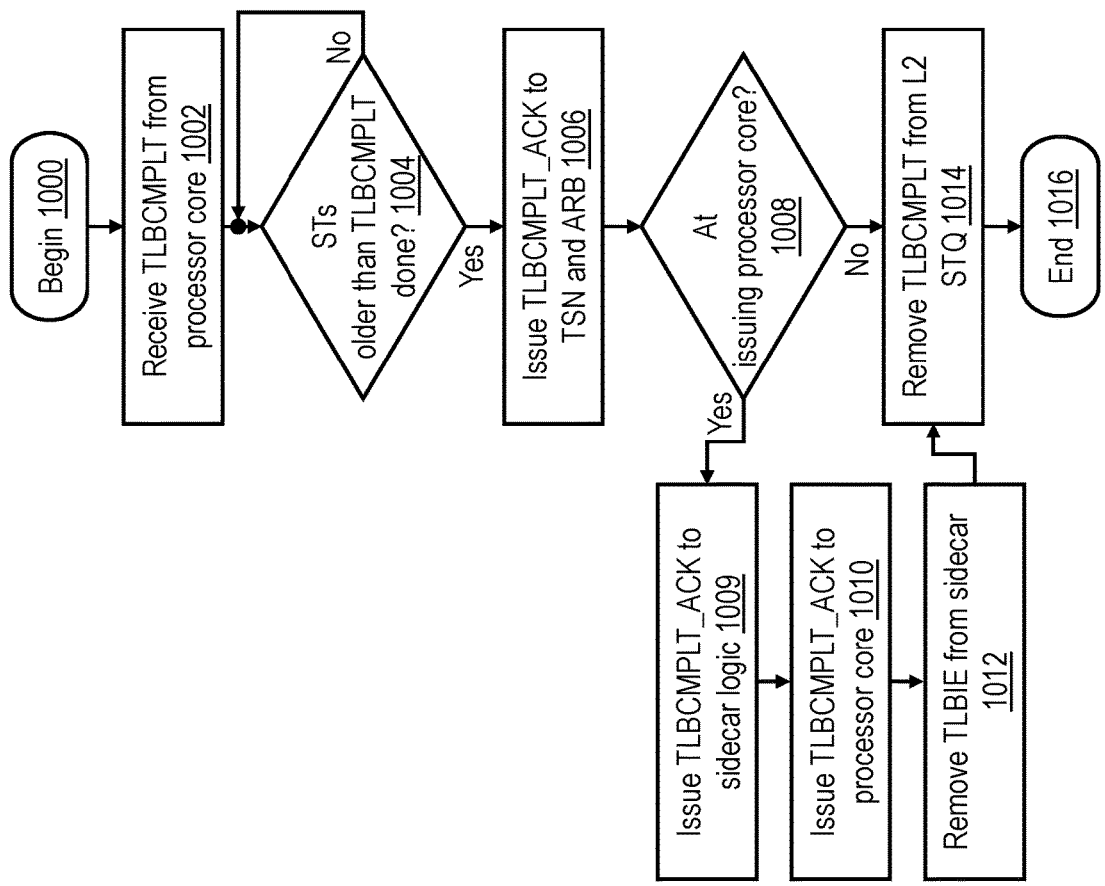
FIG. 10 is a high-level logical flowchart of an exemplary method by which a store queue of a processing unit processes a translation invalidation complete request in accordance with one embodiment.

Referring now to FIG. 10, there is depicted a high-level logical flowchart of an exemplary method by which an L2 STQ 320 processes a TLBCMPLT request in accordance with one embodiment. The process of FIG. 10 begins at block 1000 and then proceeds to block 1002, which illustrates L2 STQ 320 receiving and enqueuing in one of its entries a TLBCMPLT request issued by its associated processor core 200 as described above with reference to block 910 of FIG. 9A. At illustrated at block 1004, following receipt of the TLBCMPLT request L2 STQ 320 waits until all older store requests, if any, of all hardware threads drain from L2 STQ 320 and RC machines 342. Once all of the older store requests, if any, have drained from L2 STQ 320 and RC machines 342, the process proceeds from block 1004 to block 1006, which illustrates L2 STQ 320 transmitting a TLBCMPLT_ACK signal via bus 330 to TSN machine 346 that issued the TLBIE request and to arbiter 348, which as noted above with reference to blocks 706 and 806 are awaiting confirmation of completion of processing of the TLBIE request.

At block 1008, L2 STQ 320 determines whether or not the affiliated processor core 200 is the initiating processor core of the TLBIE request whose completion is signaled by the TLBCMPLT request, for example, by examining the thread-identifying information in the TLBCMPLT request. If not (meaning that the process is being performed at an L2 cache 230 associated with a snooping processing core 200), processing of the TLIBIE request is complete, and L2 STQ 320 removes the TLBCMPLT request from L2 STQ 320 (block 1014). Thereafter, the process ends at block 1016.

If, on the other hand, L2 cache 320 determines at block 1008 that its affiliated processor core 200 is the initiating processor core 200 of a TLBIE request buffered in sidecar logic 322, the process proceeds from block 1008 to block 1009, which illustrates L2 STQ 320 issuing the TLBCMPLT_ACK signal to sidecar logic 322 via bus 330. In response to receipt of the TLBCMPLT_ACK signal, sidecar logic 322 issues a TLBCMPLT_ACK signal to the affiliated processor core 200 via bus 325 (block 1010). As noted above with reference to block 508 of FIG. 5, receipt of the TLBCMPLT_ACK signal frees the initiating thread of processor core 200 to resume dispatch of new instructions (i.e., TSYNC instruction 408, whose behavior is explained with reference to FIG. 11). The relevant sidecar 324 then removes the completed TLBIE request (block 1012), and the process passes to blocks 1014 and 1016, which have been described.

With reference now to FIG. 11, there is illustrated a high-level logical flowchart of an exemplary method by which a processor core 200 processes a translation synchronization (e.g., TSYNC) instruction in accordance with one embodiment.

The illustrated process begins at block 1100 and then proceeds to block 1101, which illustrates execution of a TSYNC instruction 408 in an instruction sequence 400 by execution unit(s) 300 of a processor core 200. In response to execution of TSYNC instruction 408, processor core 200 pauses the dispatch of any following instructions in the hardware thread (block 1102). As noted above, dispatch is paused because in the exemplary embodiment of FIG. 3A sidecar logic 322 includes only a single sidecar 324 per hardware thread of the processor core 200, meaning that at most one TLBIE or TSYNC request per thread can be active at a time.

At block 1104, a TSYNC request corresponding to TSYNC instruction 408 is generated and issued to L1 STQ 304. The TSYNC request may include, for example, a transaction type indicating the type of the request (i.e., TSYNC) and an indication of the initiating processor core 200 and hardware thread that issued the TSYNC request. Processing of requests in L1 STQ 304 progresses, and the TSYNC request eventually moves from L1 STQ 304 to L2 STQ 320 via bus 318 as indicated at block 1106. The process then proceeds to block 1108, which illustrates that the initiating processor core 200 continues to refrain from dispatching instructions within the initiating hardware thread until it receives a TSYNC_ACK signal from the storage subsystem via bus 325, indicating that processing of the TSYNC request by the initiating processor core 200 is complete. (Generation of the TSYNC_ACK signal is described below with reference to block 1210 of FIG. 12.) It should again be noted that because dispatch of instructions within the initiating thread is paused, there can be no contention for the sidecar 324 of the initiating hardware thread by another TLBIE request, as, for any given thread, only one of the two types of requests can be present in L2 STQ 320 and sidecar logic 322 at a time.

In response to a determination at block 1108 that a TSYNC_ACK signal has been received, the process proceeds to block 1110, which illustrates processor core 200 resuming dispatch of instructions in the initiating thread; thus, release of the thread at block 1110 allows processing of HWSYNC instruction 410 (which is the next instruction in instruction sequence 400) to begin. Thereafter, the process of FIG. 11 ends at block 1112.

Referring now to FIG. 12, there is depicted a high-level logical flowchart of an exemplary method by which sidecar logic 324 processes a TSYNC request in accordance with one embodiment. The process begins at block 1200 and then proceeds to block 1202, which depicts sidecar logic 324 monitoring for notification via interface 321 that a TSYNC request has been enqueued in L2 STQ 320. In response to receipt of notification via interface 321 that a TSYNC request has been enqueued in L2 STQ 320, sidecar logic 322 moves the TSYNC request via interface 321 to the sidecar 324 of the initiating hardware thread (block 1204). In response to receiving the TSYNC request, the sidecar 324 issues the TSYNC request on system fabric 110, 114 via interface 326 (block 1206) and then monitors the coherence response to the TSYNC request to determine whether or not any TSN machine 346 provided a Retry coherence response as previously described with respect to block 724 of FIG. 7 (block 1208). As noted above, a TSN machine 346 provides a Retry coherence response if the TSN machine is still in the TLBIE_active state and waiting for its snooping processor core 200 to complete processing of the preceding TLBIE request of the same initiating processor core 200 and hardware thread. It can be noted that by the time a TSYNC request is issued, the issuing processing unit's TSN machine 346 will no longer be in the TLBIE_active state and will not issue a Retry coherence response because the TLBCMPLT_ACK signal resets the issuing processor core's TSN machine 346 to an inactive state at box 1006 before the TLBCMPLT_ACK is issued to the initiating processor core 200 at block 1010. Receipt of the TLBCMPLT_ACK signal by the processor core 200 causes the initiating processor core 200 to resume dispatching instructions after the TLBIE instruction 406 and thus execute TSYNC instruction 408 to generate the TSYNC request. However, the initiating processor core 200 may complete processing the TLBIE request long before the snooping processing cores 200 have completed their translation entry invalidations and drained the memory-referent instructions marked as dependent or possibly dependent on the invalidated translation entries. Consequently, the TSYNC request ensures that the invalidation of the translation entries and draining of the memory-referent instructions dependent on the invalidated translation entries at the snooping processing cores 200 is complete before the initiating processor core 200 executes HWSYNC instruction 410.

Once the all the snooping processor cores 200 have completed their processing of the TLBIE request, eventually the TSYNC request will complete without a Retry coherence response. In response to the TSYNC request completing without a Retry coherence response at block 1208, the sidecar 324 issues a TSYNC_ACK signal to the initiating processor core 200 via bus 325 (block 1210). As described above with reference to block 1108, in response to receipt of the TSYNC_ACK signal the initiating processor core 200 executes HWSYNC instruction 410, which completes the initiating thread's ordering requirements with respect to younger memory-referent instructions. Following block 1210, the sidecar 324 removes the TSYNC request (block 1212), and the process returns to block 1202, which has been described.

Having now described instruction sequence 400 of FIG. 4A and the associated processing in detail with reference to FIGS. 5-12, reference is now made to FIG. 4B, which illustrates an alternative code sequence 420 that reduces the number of instructions, and in particular, synchronization instructions, in the translation invalidation sequence. As shown, instruction sequence 420 includes one or more store instructions 422 to invalidate PTEs 222 in page frame table 220, a HWSYNC instruction 424, and one or more TLBIE instructions 426 that invalidate cached translation entries for specified effective addresses in all processor cores 200. Instructions 422-426 thus correspond to instructions 402-406 of instruction sequence 400 of FIG. 4A. Instruction sequence 420 additionally includes a PTESYNC instruction 430 immediately following TLBIE instruction 426. PTESYNC instruction 430 combines the work performed by TSYNC instruction 408 and HWSYNC instruction 410 of instruction sequence 400 of FIG. 4A into a single instruction. That is, execution of PTESYNC instruction 430 generates a PTESYNC request that is broadcast to all processing units 104 of data processing system 100 to both ensure systemwide completion of the TLBIE request generated by TLBIE instruction 426 (as does the TSYNC request generated by execution of TSYNC instruction 408) and to enforce instruction ordering with respect to younger memory-referent instructions (as does the HWSYNC request generated by execution of HWSYNC instruction 410).

Given the similarities of instruction sequence 420 and 400, processing of instruction sequence 420 is the same as that for instruction sequence 400 given in FIGS. 5-12, except for the processing related to the PTESYNC request generated by execution of PTESYNC instruction 430, which is described below with reference to FIGS. 13-15.

Figure 13:
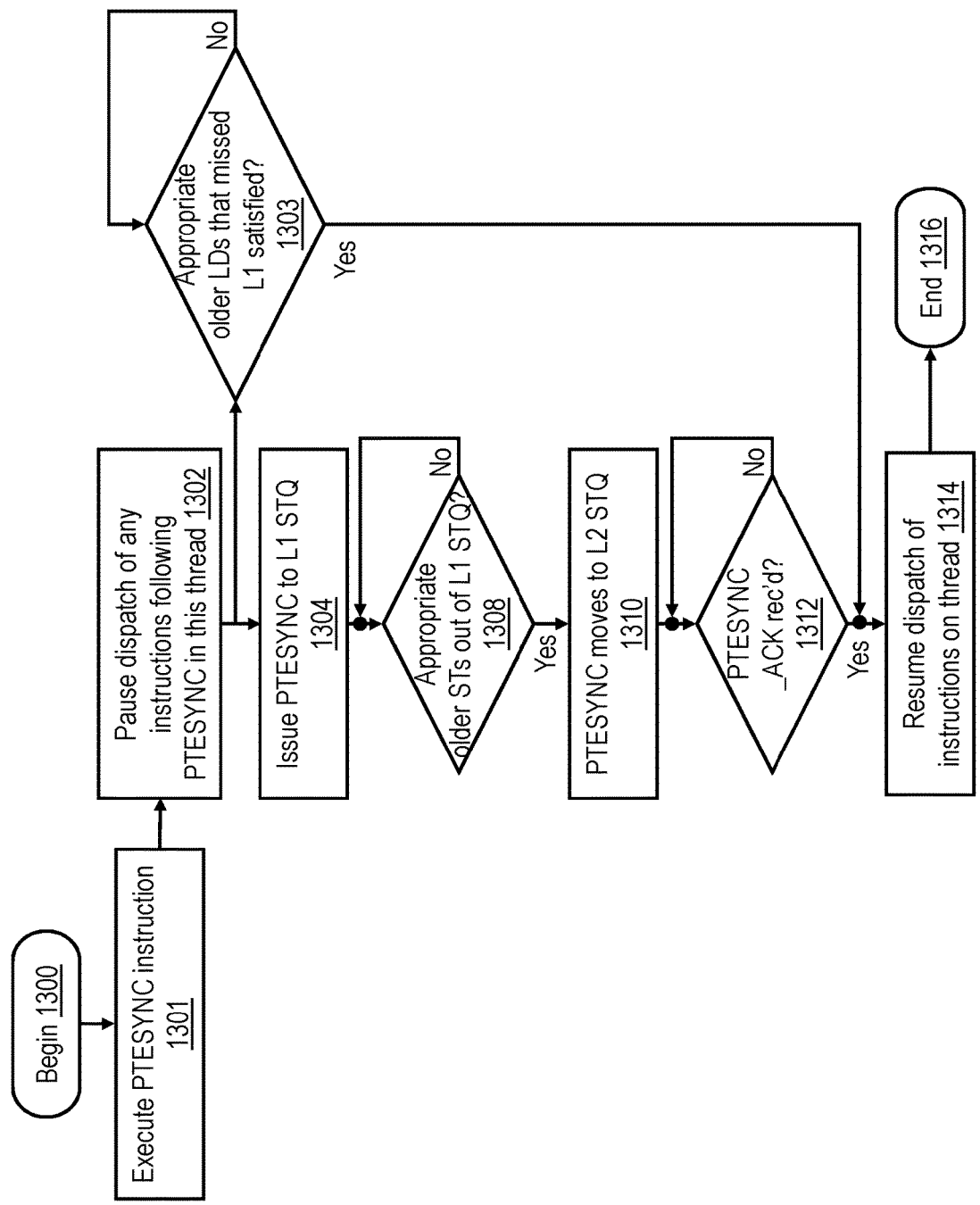
FIG. 13 is a high-level logical flowchart of an exemplary method by which a processing core processes a page table synchronization instruction in accordance with one embodiment.

With reference now to FIG. 13, there is illustrated a high-level logical flowchart of an exemplary method by which a processing core 200 processes a page table synchronization (e.g., PTESYNC) instruction 430 in accordance with one embodiment. As noted above, PTESYNC instruction 430 and the PTESYNC request generated by its execution have two functions, namely, ensuring systemwide completion of the TLBIE request(s) generated by TLBIE instruction(s) 426 and to enforce instruction ordering with respect to younger memory-referent instructions.

The illustrated process begins at block 1300 and then proceeds to block 1301, which illustrates a processor core 200 generating a PTESYNC request by execution of a PTESYNC instruction 430 in an instruction sequence 420 in execution unit(s) 300. The PTESYNC request may include, for example, a transaction type indicating the type of the request (i.e., PTESYNC) and an indication of the initiating processor core 200 and hardware thread that issued the PTESYNC request. In response to execution of PTESYNC instruction 430, processor core 200 pauses the dispatch of any younger instructions in the initiating hardware thread (block 1302). As noted above, dispatch is paused because in the exemplary embodiment of FIG. 3A sidecar logic 322 includes only a single sidecar 324 per hardware thread of the processor core 200, meaning that in this embodiment at most one TLBIE or PTESYNC request per thread can be active at a time.

Following block 1302, the process of FIG. 13 proceeds in parallel to block 1303 and blocks 1304-1312. Block 1303 represents the initiating processor core 200 performing the load ordering function of the PTESYNC request by waiting for all appropriate older load requests of all hardware threads (i.e., those that would be architecturally required by a HWSYNC to receive their requested data prior to completion of processing of the HWSYNC request) to drain from LMQ 306. By waiting for these load requests to be satisfied at block 1303, it is guaranteed that the set of load requests identified at block 906 will receive data from the correct memory page (even if the target address was on the memory page being reassigned) rather than a reassigned memory page.

In parallel with block 1303, processor core 200 also issues the PTESYNC request corresponding to PTESYNC instruction 430 to L1 STQ 304 (block 1304). The process proceeds from block 1304 to block 1308, which illustrates processor core 200 performing the store ordering function of the PTESYNC request by waiting until all appropriate older store requests of all hardware threads (i.e., those that would be architecturally required by a HWSYNC to have drained from L1 STQ 304) to drain from L1 STQ 304. Once the store ordering performed at block 1308 is complete, the PTESYNC request is issued from L1 STQ 304 to L2 STQ 320 via bus 318 as indicated at block 1310.

The process then proceeds from block 1310 to block 1312, which illustrates the initiating processor core 200 monitoring to detect receipt of a PTESYNC_ACK signal from the storage subsystem via bus 325 indicating that processing of the PTESYNC request by the initiating processor core 200 is complete. (Generation of the PTESYNC_ACK signal is described below with reference to block 1410 of FIG. 14.) It should again be noted that because dispatch of instructions within the initiating hardware thread remains paused, there can be no contention for the sidecar 324 of the initiating hardware thread by another TLBIE request, as, for any given thread, only one of a TLBIE request or PTESYNC request can be present in L2 STQ 320 and sidecar logic 322 at a time.

Only in response to affirmative determinations at both of blocks 1303 and 1312, the process of FIG. 13 proceeds to block 1314, which illustrates processor core 200 resuming dispatch of instructions in the initiating thread; thus, release of the thread at block 1314 allows processing of instructions following PTESYNC instruction 430 to begin. Thereafter, the process of FIG. 13 ends at block 1316.

Figure 14:
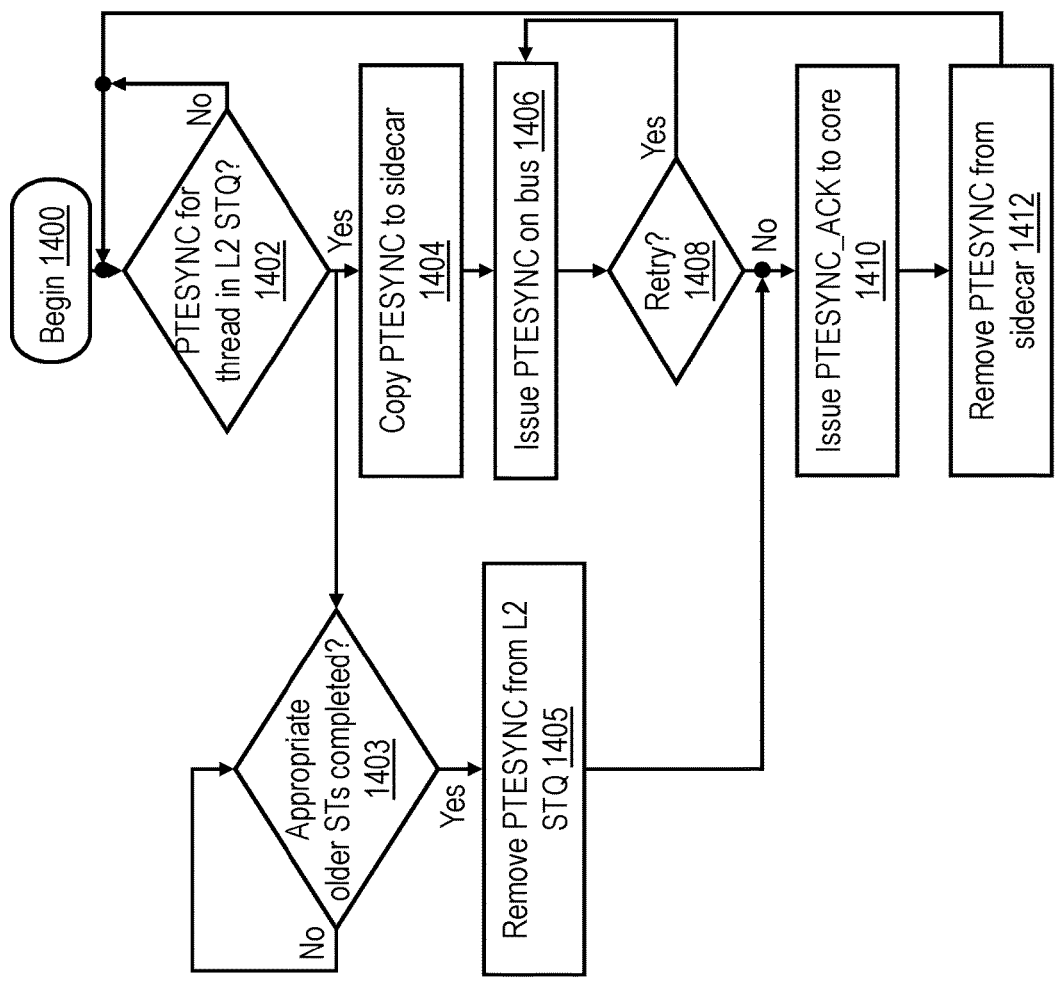
FIG. 14 is a high-level logical flowchart of an exemplary method by which a processing unit processes a page table synchronization request in accordance with one embodiment.

Referring now to FIG. 14, there is depicted a high-level logical flowchart of an exemplary method by which L2 STQ 320 and sidecar logic 322 of a processing unit 104 process a PTESYNC request in accordance with one embodiment. The process of FIG. 14 begins at block 1400 and then proceeds to block 1402, which depicts L2 STQ 320 monitoring for receipt of a PTESYNC request from L1 STQ 304, as described above with reference to block 1310 of FIG. 13. In the second embodiment of FIG. 4B, in response to receipt of the PTESYNC request, L2 STQ 320 and sidecar logic 324 cooperate to perform two functions, namely, (1) store ordering for store requests within L2 STQ 320 and (2) ensuring completion of the TLBIE request at all of the other processing cores 200. In the embodiment of FIG. 14, these two functions are performed in parallel along the two paths illustrated at blocks 1403, 1405 and blocks 1404, 1406 and 1408, respectively. In alternative embodiments, these functions could instead be serialized by first performing the ordering function illustrated at blocks 1403 and 1405 and then ensuring completion of the TLBIE request at blocks 1404, 1406, and 1408. (It should be noted that attempting to serialize the ordering of these function by ensuring completion of the TLBIE request prior to performing store ordering can create a deadlock.)

Referring now to block 1403-1405, L2 STQ 320 performs store ordering for the PTESYNC request by ensuring that all appropriate older store requests within L2 STQ 320 have been drained from L2 STQ 320. The set of store requests that are ordered at block 1403 includes a first subset that may have had their target addresses translated by the translation entry invalidated by the earlier TLBIE request. This first subset corresponds to those marked at block 906. In addition, the set of store requests that are ordered at block 1403 includes a second subset that includes those architecturally defined store requests would be ordered by a HWSYNC. Once all such store requests have drained from L2 STQ 320, L2 STQ 320 removes the PTESYNC request from L2 STQ 320 (block 1405). Removal of the PTESYNC request allows store requests younger than the PTESYNC request to flow through L2 STQ 320.

Referring now to block 1404, sidecar logic 322 detects the presence of the PTESYNC request in L2 STQ 320 and copies the PTESYNC request to the appropriate sidecar 324 via interface 321 prior to removal of the PTESYNC request from L2 STQ 320 at block 1405. The process then proceeds to the loop illustrated at blocks 1406 and 1408 in which sidecar logic 322 continues to issue PTESYNC requests on system fabric 110, 114 until no processor core 200 responds with a Retry coherence response (i.e., until the preceding TLBIE request of the same processor core and hardware thread has been completed by all snooping processor cores 200).

Only in response to completion of both of the functions depicted at blocks 1403, 1405 and blocks 1404, 1406 and 1408, the process proceeds to block 1410, which illustrates sidecar logic 322 issuing a PTESYNC_ACK signal to the affiliated processor core via bus 325. Sidecar logic 322 then removes the PTESYNC request from the sidecar 324 (block 1412), and the process returns to block 1402, which has been described.

Figure 15:
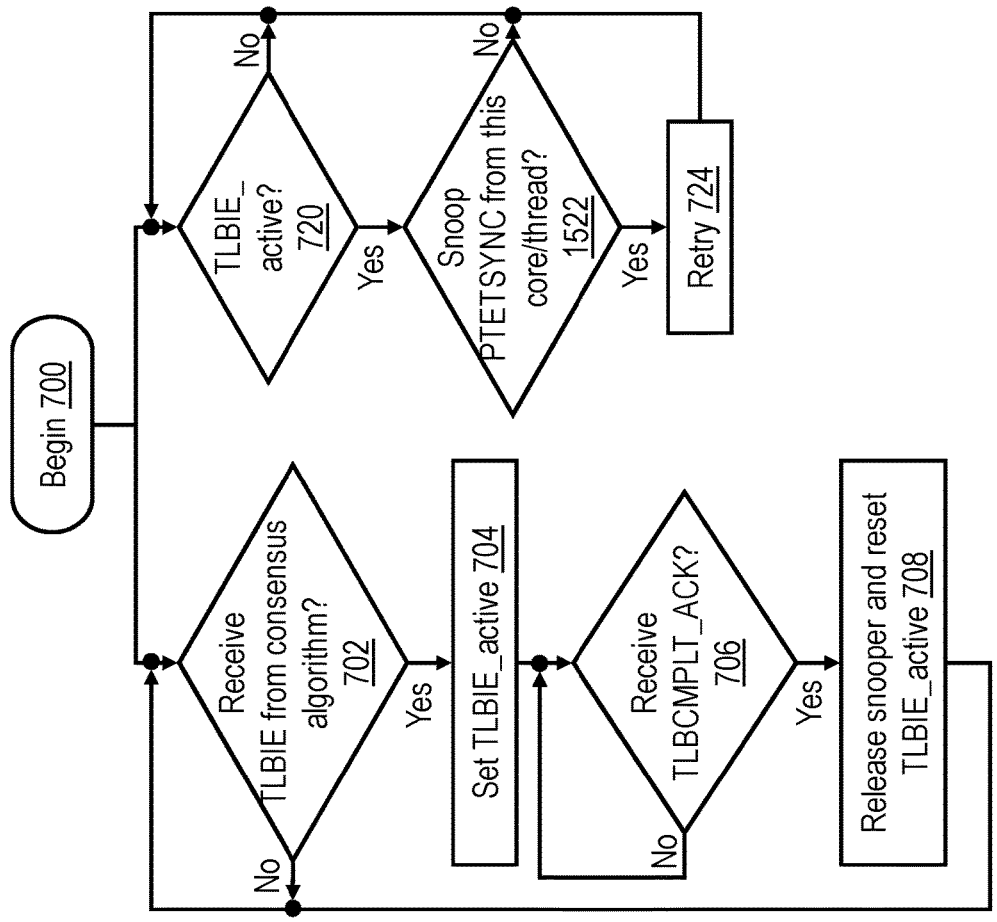
FIG. 15 is a high-level logical flowchart of an exemplary method by which snooper logic of a processing unit processes translation invalidation requests, translation invalidation complete requests, and page table synchronization requests in accordance with one embodiment.

With reference now to FIG. 15, there is a high-level logical flowchart of an exemplary method by which TSN machines 346 process TLBIE requests, TLBCMPT_ACK signals, and PTESYNC requests in accordance with one embodiment. As indicated by like reference numerals, FIG. 15 is the same as previously described FIG. 7, except for block 1522. Block 1522 illustrates that while in the TLBIE_active state established at block 704, the TSN machine 346 monitors to determine if a PTESYNC request specifying an initiating processor core and hardware thread matching its TLBIE request has been detected. If not, the process continues to iterate at the loop including blocks 720 and 1522. However, in response to a TSN machine 346 detecting a PTESYNC request specifying a processor core and initiating hardware thread matching its TLBIE request while in the TLBIE_active state, TSN machine 346 provides a Retry coherence response, as indicated at block 724. As discussed above, a Retry coherence response by any TSN snooper 346 handling the TLBIE request for the initiating hardware thread forces the PTESYNC request to be retried and prevents the initiating hardware thread from executing any memory-referent instructions younger than PTESYNC instruction 430 until the PTESYNC request completes without a Retry coherence response.

Figure 16:
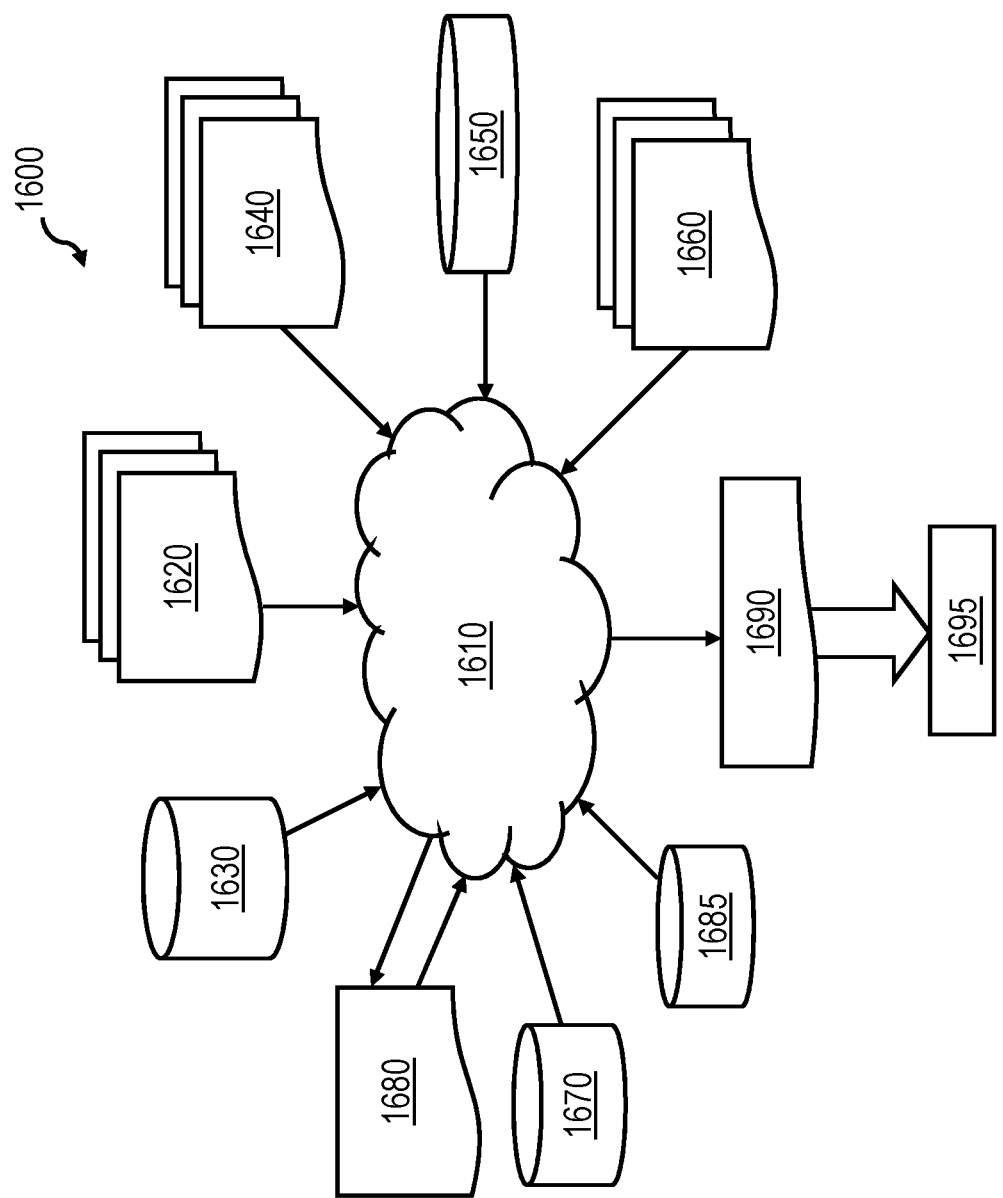
FIG. 16 is a data flow diagram illustrating a design process.

With reference now to FIG. 16, there is depicted a block diagram of an exemplary design flow 1600 used for example, in semiconductor IC logic design, simulation, test, layout, and manufacture. Design flow 1600 includes processes, machines and/or mechanisms for processing design structures or devices to generate logically or otherwise functionally equivalent representations of the design structures and/or devices described above and shown in FIGS. 1-3. The design structures processed and/or generated by design flow 1600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1600 may vary depending on the type of representation being designed. For example, a design flow 1600 for building an application specific IC (ASIC) may differ from a design flow 1600 for designing a standard component or from a design flow 1600 for instantiating the design into a programmable array, for example a programmable gate array (PGA) or a field programmable gate array (FPGA) offered by Altera® Inc. or Xilinx® Inc.

FIG. 16 illustrates multiple such design structures including an input design structure 1620 that is preferably processed by a design process 1616. Design structure 1620 may be a logical simulation design structure generated and processed by design process 1616 to produce a logically equivalent functional representation of a hardware device. Design structure 1620 may also or alternatively comprise data and/or program instructions that when processed by design process 1616, generate a functional representation of the physical structure of a hardware device. Whether representing functional and/or structural design features, design structure 1620 may be generated using electronic computer-aided design (ECAD) such as implemented by a core developer/designer. When encoded on a machine-readable data transmission, gate array, or storage medium, design structure 1620 may be accessed and processed by one or more hardware and/or software modules within design process 1616 to simulate or otherwise functionally represent an electronic component, circuit, electronic or logic module, apparatus, device, or system such as those shown in FIGS. 1-3. As such, design structure 1620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1616 preferably employs and incorporates hardware and/or software modules for synthesizing, translating, or otherwise processing a design/simulation functional equivalent of the components, circuits, devices, or logic structures shown in FIGS. 1-3 to generate a netlist 1680 which may contain design structures such as design structure 1620. Netlist 1680 may comprise, for example, compiled or otherwise processed data structures representing a list of wires, discrete components, logic gates, control circuits, I/O devices, models, etc. that describes the connections to other elements and circuits in an integrated circuit design. Netlist 1680 may be synthesized using an iterative process in which netlist 1680 is resynthesized one or more times depending on design specifications and parameters for the device. As with other design structure types described herein, netlist 1680 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1616 may include hardware and software modules for processing a variety of input data structure types including netlist 1680. Such data structure types may reside, for example, within library elements 1630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1640, characterization data 1650, verification data 1660, design rules 1670, and test data files 1685 which may include input test patterns, output test results, and other testing information. Design process 1616 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1616 without deviating from the scope and spirit of the invention. Design process 1616 may also include modules for performing standard circuit design processes such as timing analysis, verification, design rule checking, place and route operations, etc.

Design process 1616 employs and incorporates logic and physical design tools such as HDL compilers and simulation model build tools to process design structure 1620 together with some or all of the depicted supporting data structures along with any additional mechanical design or data (if applicable), to generate a second design structure 1690. Design structure 1690 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1620, design structure 1690 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3. In one embodiment, design structure 1690 may comprise a compiled, executable HDL simulation model that functionally simulates the devices shown in FIGS. 1-3.

Design structure 1690 may also employ a data format used for the exchange of layout data of integrated circuits and/or symbolic data format (e.g., information stored in a GDSII (GDS2), GL1, OASIS, map files, or any other suitable format for storing such design data structures). Design structure 1690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-3. Design structure 1690 may then proceed to a stage 1695 where, for example, design structure 1690: proceeds to tape-out, is released to manufacturing, is released to a mask house, is sent to another design house, is sent back to the customer, etc.

As has been described, in at least one embodiment a memory-referent instruction is executed to calculate a target effective address (EA) of a corresponding memory-referent request. An array entry in an upper level cache is allocated, and the EA is specified in a corresponding EA directory entry. While in-flight, the memory-referent request is buffered in a queue in association with a pointer to the entry in the EA directory. Based on receiving a translation invalidation request requesting invalidation of an address translation in a translation structure, the processor core walks the EA directory, determines the EA in the entry matches an address range specified by the translation invalidation request, and, based on the match, precisely marks the memory-referent request using the pointer to the EA directory entry. Based on the marking, the translation invalidation request is permitted to complete with reference to the processor core only after the memory-referent request has drained from the processing unit.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of processing in a processing unit of a data processing system, the method comprising:
   executing, in a processor core, a memory-referent instruction to calculate a target effective address (EA) of a corresponding memory-referent request;
   allocating an entry in a data array of an upper level cache and specifying the target EA in a corresponding entry in an EA directory of the upper level cache;
   buffering the memory-referent request while in-flight in a queue including a plurality of memory-referent requests, wherein the buffering includes buffering the memory-referent request in association with a pointer to the entry in the EA directory specifying the target EA;
   based on receiving a translation invalidation request requesting invalidation of an address translation in an translation structure in the processor core, the processor core walking the EA directory, determining the target EA in the entry matches an address range specified by the translation invalidation request, and, based on determining the match, precisely marking the memory-referent request based on the pointer to the entry buffered in association with the memory-referent request; and
   based on the marking, permitting the translation invalidation request to complete with reference to the processor core only after the memory-referent request has drained from the processing unit.

2. The method of claim 1, wherein:
   the memory-referent request is a store-type request; and
   the allocating includes allocating the entry in the data array of the upper level cache based on a miss of the EA in the EA directory.

3. The method of claim 2, wherein the buffering includes buffering the store-type request in a store queue.

4. The method of claim 3, wherein:
   the store queue is associated with a lower level cache; and
   the marking includes marking the store-type request in the store queue of the lower level cache.

5. The method of claim 1, wherein:
   the EA directory and data array of the upper level cache are set-associative; and
   the pointer identifies a congruence class and way of the entry in the data array and the directory entry in the EA directory.

6. The method of claim 1, wherein:
   the memory-referent request is a load-type request; and
   the queue is one of the following: a load miss queue and a load reorder queue.

7. A processing unit for a data processing system, the processing unit comprising:
   an execution unit that executes a memory-referent instruction to calculate a target effective address (EA) of a corresponding memory-referent request;
   an upper level cache including a data array and an EA directory of the data array, wherein the data array includes an entry allocated to the memory-referent request and the EA directory includes a corresponding directory entry specifying the target EA;
   a translation structure that caches address translations;
   a memory management unit that translates EAs to real addresses by reference to the translation structure;

a queue configured to buffer a plurality of in-flight memory-referent requests including the memory-referent request, wherein the queue buffers the memory-referent request in association with a pointer to the directory entry in the EA directory specifying the target EA;

translation sequencing logic that is configured to, based on receiving a translation invalidation request requesting invalidation of an address translation in the translation structure:

walks the EA directory, determines the target EA in the entry matches an address range specified by the translation invalidation request, and, based on determining the match, precisely marks the memory-referent request based on the pointer to the entry buffered in association with the memory-referent request; and based on the marking, permits the translation invalidation request to complete with reference to the processing unit only after the memory-referent request has drained from the processing unit.

8. The processing unit of claim 7, wherein:
the memory-referent request is a store-type request; and
the processing unit allocates the entry in the data array of the upper level cache based on a miss of the EA in the EA directory.

9. The processing unit of claim 8, wherein the queue is a store queue.

10. The processing unit of claim 9, wherein:
the processing unit includes a lower level cache;
the store queue is associated with the lower level cache; and
the marking includes marking the store-type request in the store queue of the lower level cache.

11. The processing unit of claim 7, wherein:
the EA directory and data array of the upper level cache are set-associative; and
the pointer identifies a congruence class and way of the entry in the data array and the directory entry in the EA directory.

12. The processing unit of claim 7, wherein:
the memory-referent request is a load-type request; and
the queue is one of the following: a load miss queue and a load reorder queue.

13. A data processing system including a plurality of processing units according to claim 7 and a system fabric coupling the plurality of processing units.

14. A design structure tangibly embodied in a machine-readable storage device for designing, manufacturing, or testing an integrated circuit, the design structure comprising:
a processing unit for a data processing system, the processing unit including:
an execution unit that executes a memory-referent instruction to calculate a target effective address (EA) of a corresponding memory-referent request;
an upper level cache including a data array and an EA directory of the data array, wherein the data array includes an entry allocated to the memory-referent request and the EA directory includes a corresponding directory entry specifying the target EA;
a translation structure that caches address translations;
a memory management unit that translates EAs to real addresses by reference to the translation structure;
a queue configured to buffer a plurality of in-flight memory-referent requests including the memory-referent request, wherein the queue buffers the memory-referent request in association with a pointer to the directory entry in the EA directory specifying the target EA;
translation sequencing logic that is configured to, based on receiving a translation invalidation request requesting invalidation of an address translation in the translation structure:
walks the EA directory, determines the target EA in the entry matches an address range specified by the translation invalidation request, and, based on determining the match, precisely marks the memory-referent request based on the pointer to the entry buffered in association with the memory-referent request; and
based on the marking, permits the translation invalidation request to complete with reference to the processing unit only after the memory-referent request has drained from the processing unit.

15. The design structure of claim 14, wherein:
the memory-referent request is a store-type request; and
the processing unit allocates the entry in the data array of the upper level cache based on a miss of the EA in the EA directory.

16. The design structure of claim 15, wherein the queue is a store queue.

17. The design structure of claim 16, wherein:
the processing unit includes a lower level cache;
the store queue is associated with the lower level cache; and
the marking includes marking the store-type request in the store queue of the lower level cache.

18. The design structure of claim 14, wherein:
the EA directory and data array of the upper level cache are set-associative; and
the pointer identifies a congruence class and way of the entry in the data array and the directory entry in the EA directory.

19. The design structure of claim 14, wherein:
the memory-referent request is a load-type request; and
the queue is one of the following: a load miss queue and a load reorder queue.

* * * * *